United States Patent
Fuwa

(10) Patent No.: US 7,316,210 B2
(45) Date of Patent: Jan. 8, 2008

(54) CONTROL APPARATUS AND CONTROL METHOD FOR VARIABLE VALVE ACTUATION MECHANISM OF INTERNAL COMBUSTION ENGINE

(75) Inventor: Naohide Fuwa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/360,763

(22) Filed: Feb. 24, 2006

(65) Prior Publication Data

US 2006/0191502 A1    Aug. 31, 2006

(30) Foreign Application Priority Data

Feb. 25, 2005    (JP) ............................. 2005-051857

(51) Int. Cl.
*F01L 1/34*    (2006.01)
(52) U.S. Cl. ............................. 123/90.15; 123/90.17; 123/90.16
(58) Field of Classification Search ............. 123/90.15, 123/90.17, 90.16, 90.31
See application file for complete search history.

(56) References Cited

U.S. PATENT DOCUMENTS 4,775,939 A  * 10/1988  Nakashima et al. .......... 701/49
6,311,654 B1 * 11/2001  Ushida et al. ............ 123/90.17
2002/0062801 A1  5/2002  Shimizu

FOREIGN PATENT DOCUMENTS

| EP | 2002038911 | 2/2002 |
|---|---|---|
| EP | 1 464 830 A1 | 10/2004 |
| EP | 1 577 511 A2 | 9/2005 |
| JP | 2001-263015 | 9/2001 |
| WO | WO 2004/061274 | 7/2004 |

OTHER PUBLICATIONS

European Search Report for Appln. No. 06003854.4-2311, issued May 23, 2006.

* cited by examiner

*Primary Examiner*—Zelalem Eshete
(74) *Attorney, Agent, or Firm*—Kenyon & Kenyon LLP

(57) ABSTRACT

An electronic control unit sets a target valve actuation parameter in accordance with an operating state of an internal combustion engine, and controls a variable valve actuation mechanism such that an actual valve actuation parameter of an intake valve becomes equal to the target valve actuation parameter. The variable valve actuation mechanism changes a valve actuation parameter of the intake valve. From before an initial fuel injection is performed to when a starting process of the engine is completed, the electronic control unit sets the target valve actuation parameter to an engine starting valve actuation parameter at which the valve closing timing of the intake valve coincides with or is close to a bottom dead center of the intake valve.

18 Claims, 22 Drawing Sheets

CONTROL APPARATUS AND CONTROL METHOD FOR VARIABLE VALVE ACTUATION MECHANISM OF INTERNAL COMBUSTION ENGINE

BACKGROUND OF THE INVENTION

The present invention relates to an apparatus and a method for controlling a variable valve actuation mechanism of an internal combustion engine.

A variable valve actuation mechanism of an internal combustion engine changes the valve actuation parameters of the intake valves, such as the opening period (valve duration) and opening and closing timing (valve timing). Japanese Laid-Open Patent Publication No. 2001-263015 discloses an internal combustion engine having a variable valve actuation mechanism that varies valve duration and a variable valve actuation mechanism that changes valve timing.

To correspond to the needs of market, internal combustion engines are desired to have improved starting performance. Although various proposals have been made for improving the starting performance of engines, no proposals have been made for using a variable valve actuation mechanism to meet the demands.

SUMMARY OF THE INVENTION

Accordingly, it is an objective of the present invention to provide an apparatus and a method for controlling a variable valve actuation mechanism of an internal combustion engine that improve starting performance.

To achieve the foregoing and other objectives and in accordance with the purpose of the present invention, an apparatus for controlling a variable valve actuation mechanism of an internal combustion engine is provided. The mechanism changes a valve actuation parameter of an intake valve. The apparatus includes a control section that sets a target valve actuation parameter in accordance with an operating state of the engine, and controls the variable valve actuation mechanism such that the valve actuation parameter of the intake valve becomes equal to the target valve actuation parameter. From before an initial fuel injection is performed to when a starting process of the engine is completed, the control section sets the target valve actuation parameter to an engine starting valve actuation parameter at which the valve closing timing of the intake valve coincides with or is close to a bottom dead center of the intake valve.

The present invention provides another apparatus for controlling a variable valve actuation mechanism of an internal combustion engine. The mechanism changes a valve timing of an intake valve. The apparatus includes a control section that sets a target valve timing in accordance with an operating state of the engine, and controls the variable valve actuation mechanism such that the valve timing of the intake valve becomes equal to the target valve timing. From before an initial fuel injection is performed to when a starting process of the engine is completed, the control section sets the target valve timing to an engine starting valve timing at which the valve closing timing of the intake valve coincides with or is close to a bottom dead center of the intake valve.

Further, the present invention provides an apparatus for controlling a variable valve actuation mechanism of an internal combustion engine. The mechanism changing a valve. duration of an intake valve. The apparatus includes a control section that sets a target valve duration in accordance with an operating state of the engine, and controls the variable valve actuation mechanism such that the valve duration of the intake valve becomes equal to the target valve duration. From before an initial fuel injection is performed to when a starting process of the engine is completed, the control section sets the target valve duration to an engine starting valve duration at which the valve closing timing of the intake valve coincides with or is close to a bottom dead center of the intake valve.

The present invention also provides a method for controlling a variable valve actuation mechanism of an internal combustion engine. The mechanism changes a valve actuation parameter of an intake valve. The method includes: setting a target valve actuation parameter in accordance with an operating state of the engine; and controlling the variable valve actuation mechanism such that the valve actuation parameter of the intake valve becomes equal to the target valve actuation parameter. From before an initial fuel injection is performed to when a starting process of the engine is completed, the target valve actuation parameter is set to an engine starting valve actuation parameter at which the valve closing timing of the intake valve coincides with or is close to a bottom dead center of the intake valve.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will now be described with reference to FIGS. 1 to 11.

The first embodiment is applied to an in-cylinder injection internal combustion engine 1, which includes a variable valve duration mechanism 51 functioning as a variable valve actuation mechanism.

Figure 1:
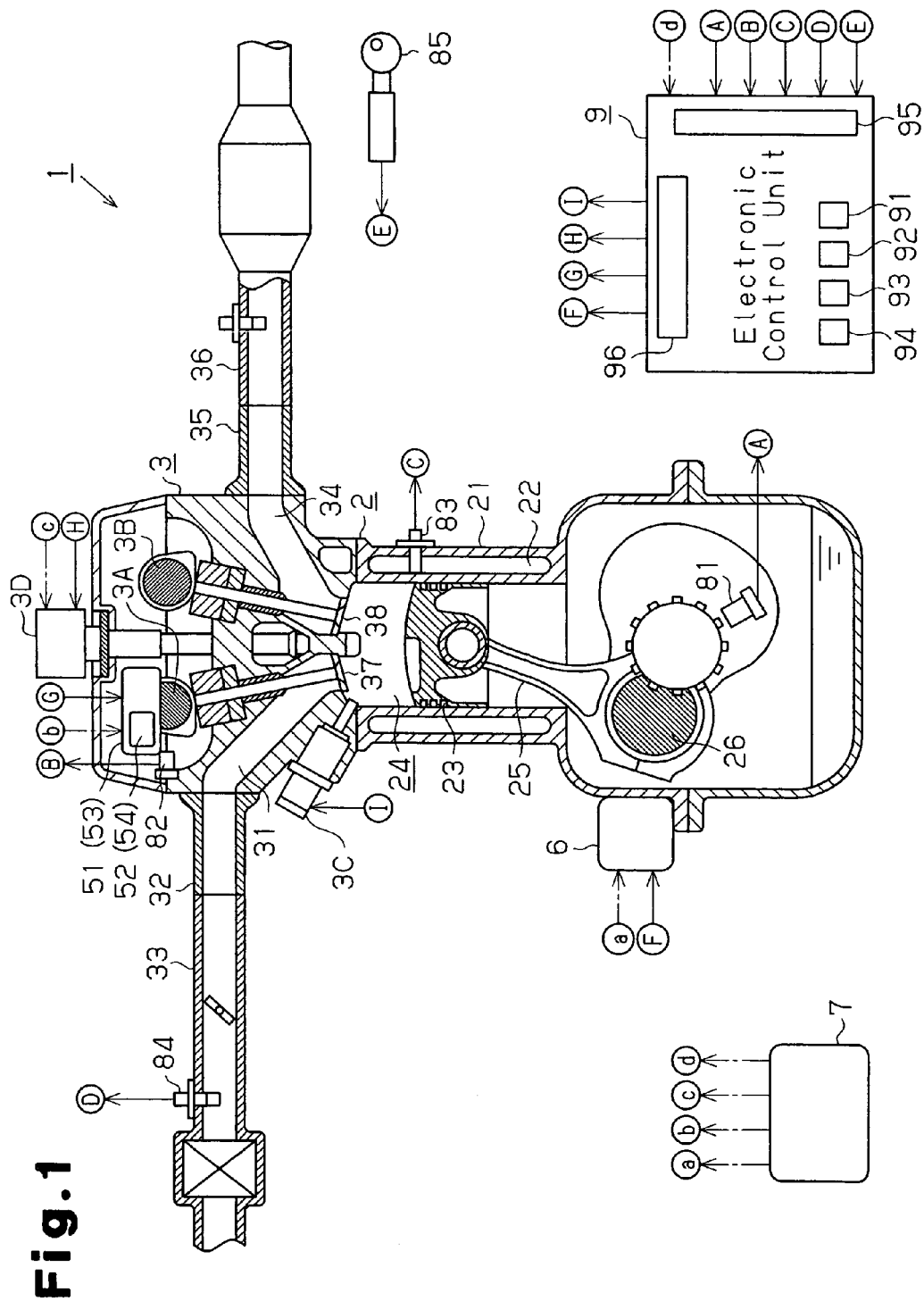
FIG. 1 is a diagram illustrating an overall structure of an engine to which an apparatus for controlling a variable valve actuation mechanism according to a first embodiment of the present invention is applied.

FIG. 1 illustrates the structure of the engine 1. The engine 1 includes a cylinder block 2 and a cylinder head 3.

The cylinder block 2 has cylinders 21. A water jacket 22 is formed about the cylinders 21. A piston 23 is housed in each cylinder 21. In each cylinder 21, the inner circumferential surface of the cylinder 21, the top surface of the piston 23, and the cylinder head 3 define a combustion chamber 24. Each piston 23 is coupled to a crankshaft 26 with a connecting rod 25.

Intake ports 31 and exhaust ports 34 are formed in the cylinder head 3.

An intake manifold 32 is connected to the intake ports 31. An intake pipe 33 is connected to the intake manifold 32. The intake pipe 33, the intake manifold 32, and the intake ports 31 form an intake passage for drawing air from the outside to the combustion chambers 24.

An exhaust manifold 35 is connected to the exhaust ports 34. An exhaust pipe 36 is connected to the exhaust manifold 35. The exhaust pipe 36, the exhaust manifold 35, and the exhaust ports 34 form an exhaust passage for discharging exhaust from the combustion chambers 24 to the outside.

Intake valves 37 are provided for opening and closing the intake ports 31. Exhaust valves 38 are provided for opening and closing the exhaust ports 34.

An intake camshaft 3A lifts the intake valves 37 with cams. An exhaust camshaft 3B lifts the exhaust valves 38 with cams.

Injectors 3C directly inject fuel into the combustion chambers 24. Ignition plugs 3D ignite air-fuel mixture in the combustion chambers 24.

The variable valve duration mechanism 51 changes the valve duration of the intake valves 37 (a crank angle from the opening to the closing of the intake valves 37). The variable valve duration mechanism 51 includes an electric actuator 52 as a drive source. In the engine 1, the electric actuator 52 actuates the variable valve duration mechanism 51 so that the valve duration of the intake valves 37 is changed.

When starting the engine 1, a starter motor 6 rotates the crankshaft 26.

A battery 7 supplies electricity to the starter motor 6, the electric actuator 52, the ignition plugs 3D, and an electronic control unit 9. In FIG. 1, paths for supplying electricity to these devices from the battery 7 are represented by alternate long and short dash lines.

Overall control of the engine 1 is performed by the electronic control unit 9. An apparatus for controlling the variable valve duration mechanism 51 (variable valve actuation mechanism) includes the electronic control unit 9. The electronic control unit 9 serves as a control section. The electronic control unit 9 is configured by a central processing unit 91, a read only memory 92, a random access memory 93, a backup memory 94, an input port 95, and an output port 96.

The central processing unit 91 executes computations related to engine control. The read only memory 92 stores programs and maps required for the engine control in advance. The random access memory 93 temporarily stores computation results of the central processing unit 91. The backup memory 94 retains computation results and stores data after the engine 1 is stopped. The input port 95 sends external signals to the central processing unit 91. The output port 96 sends signals from the central processing unit 91 to the outside.

The input port 95 of the electronic control unit 9 is connected to an ignition switch 85 and various types of sensors for detecting the operating state of the engine 1.

A crank position sensor 81 detects the rotation angle of the crankshaft 26. Data detected by the crank position sensor 81 is sent as a crank signal CA to the electronic control unit 9. Based on the crank signal CA, the electronic control unit 9 computes the rotation speed of the crankshaft 26 (the engine speed NE).

A cam position sensor 82 detects the rotation angle of the intake camshaft 3A. Data detected by the cam position sensor 82 is sent as a cam signal DA to the electronic control unit 9. Based on the cam signal DA and the crank signal CA, the electronic control unit 9 executes cylinder discrimination.

A coolant temperature sensor 83 detects the temperature of coolant in the water jacket 22. Data detected by the coolant temperature sensor 83 is sent as coolant temperature THW to the electronic control unit 9.

An intake air temperature sensor 84 detects a temperature of air drawn into the engine 1. Data detected by the intake air temperature sensor 84 is sent as intake air temperature THG to the electronic control unit 9.

The ignition switch 85 is switched to any of switching positions including OFF, ACC, ON, and START positions. When the ignition switch 85 is at the ON position, an ignition signal IG is sent to the electronic control unit 9. When the ignition switch 85 is at the START position, a starter signal STA is sent to the electronic control unit 9.

The output port 96 of the electronic control unit 9 is connected to the ignition plugs 3D and the injectors 3C.

Based on a signal from the ignition switch 85, the electronic control unit 9 executes an engine starting process (FIGS. 3 and 4) for starting the engine 1. Based on the detected data of the above listed sensors, the electronic control unit 9 executes various types of control, including fuel injection control for adjusting the amount of fuel injection from the injectors 3C, ignition timing control for adjusting the ignition timing of the ignition plugs 3D, and air-fuel ratio control for adjusting the air-fuel ratio of air-fuel mixture.

Valve Duration Change by Variable Valve Duration Mechanism

Changes of valve duration INCAM of the intake valves 37 performed by the variable valve duration mechanism 51 will now be described.

Figure 2:
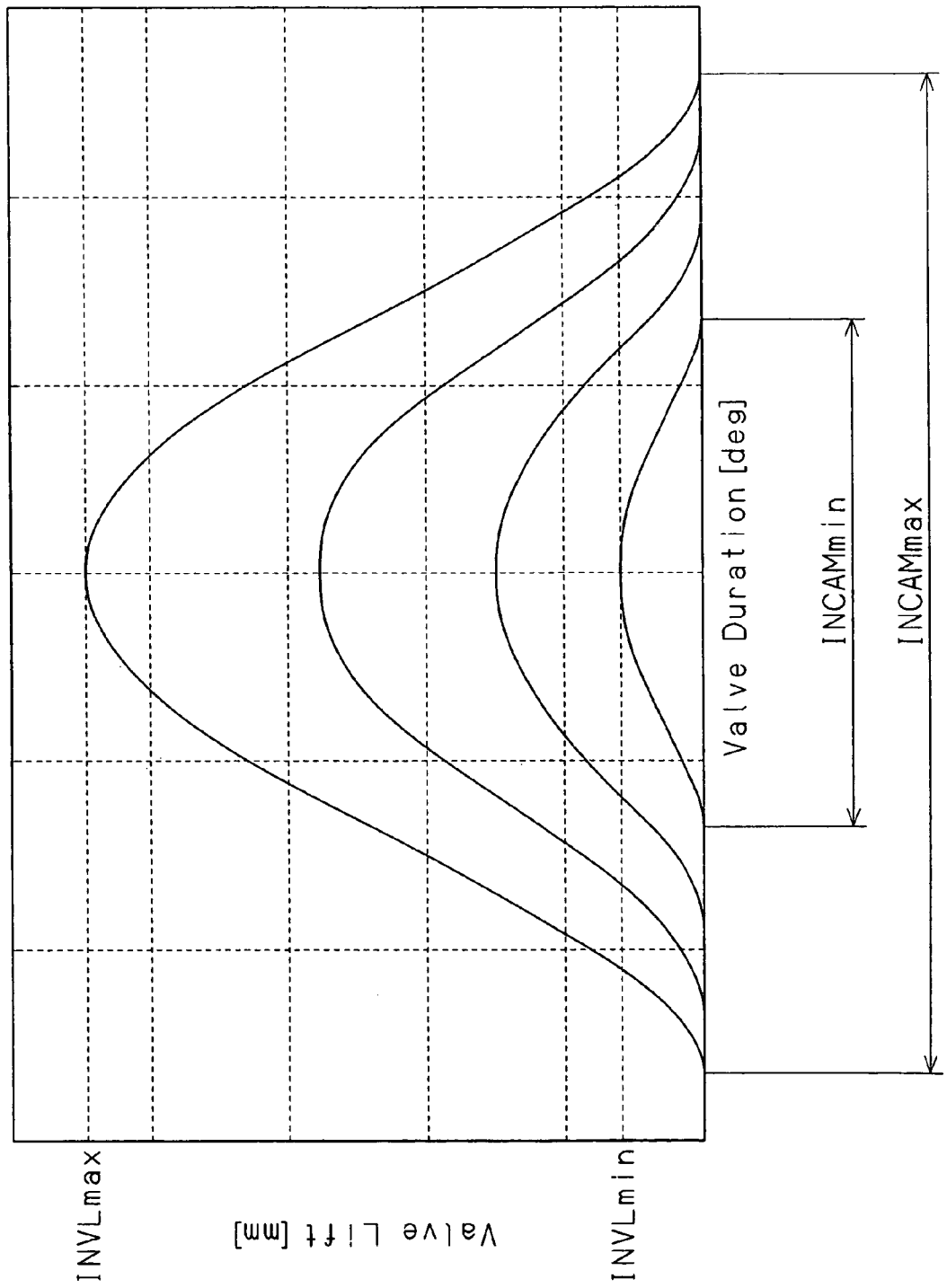
FIG. 2 is a conceptual diagram showing changes in the valve duration and the maximum valve lift made by the variable valve actuation mechanism according to the first embodiment.

As shown in FIG. 2, the valve duration INCAM is continuously changeable between a maximum valve duration INCAMmax and a minimum valve duration INCAMmin. In synchronization with changes in the valve duration INCAM, a maximum valve lift INVL of the intake valves 37 is changed. The maximum valve lift INVL represents the amount of movement from the most closed position to the most open position of each intake valve 37.

The maximum valve lift INVL is the greatest maximum valve lift (upper limit maximum valve lift INVLmax) when the valve duration INCAM is the maximum valve duration INCAMmax. The maximum valve lift INVL is the smallest maximum valve lift (lower limit maximum valve lift INVLmin) when the valve duration INCAM is the minimum valve duration INCAMmin. The maximum valve lift INVL is continuously changeable between the upper limit maximum valve lift INVLmax and the lower limit maximum valve lift INVLmin in synchronization with the valve duration INCAM.

Through a variable valve duration mechanism actuation process (FIGS. 5 to 10), the electronic control unit 9 controls the actuation of the variable valve duration mechanism 51 from the start to the end of the operation of the engine 1. That is, the valve duration INCAM is changed through the process.

Start Control of Engine

Figure 3:
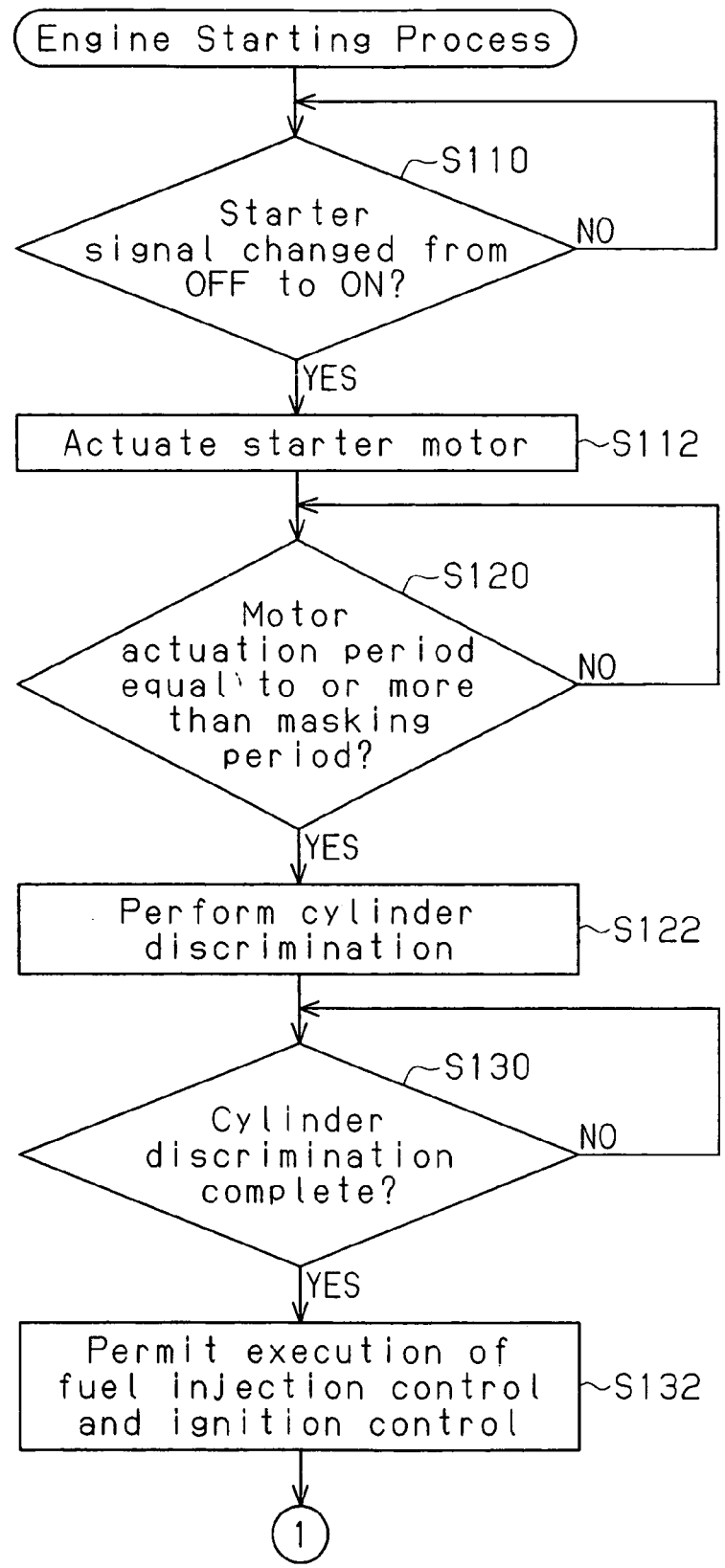
FIG. 3 is a flowchart showing a procedure of an engine starting process executed in the first embodiment.
Figure 4:
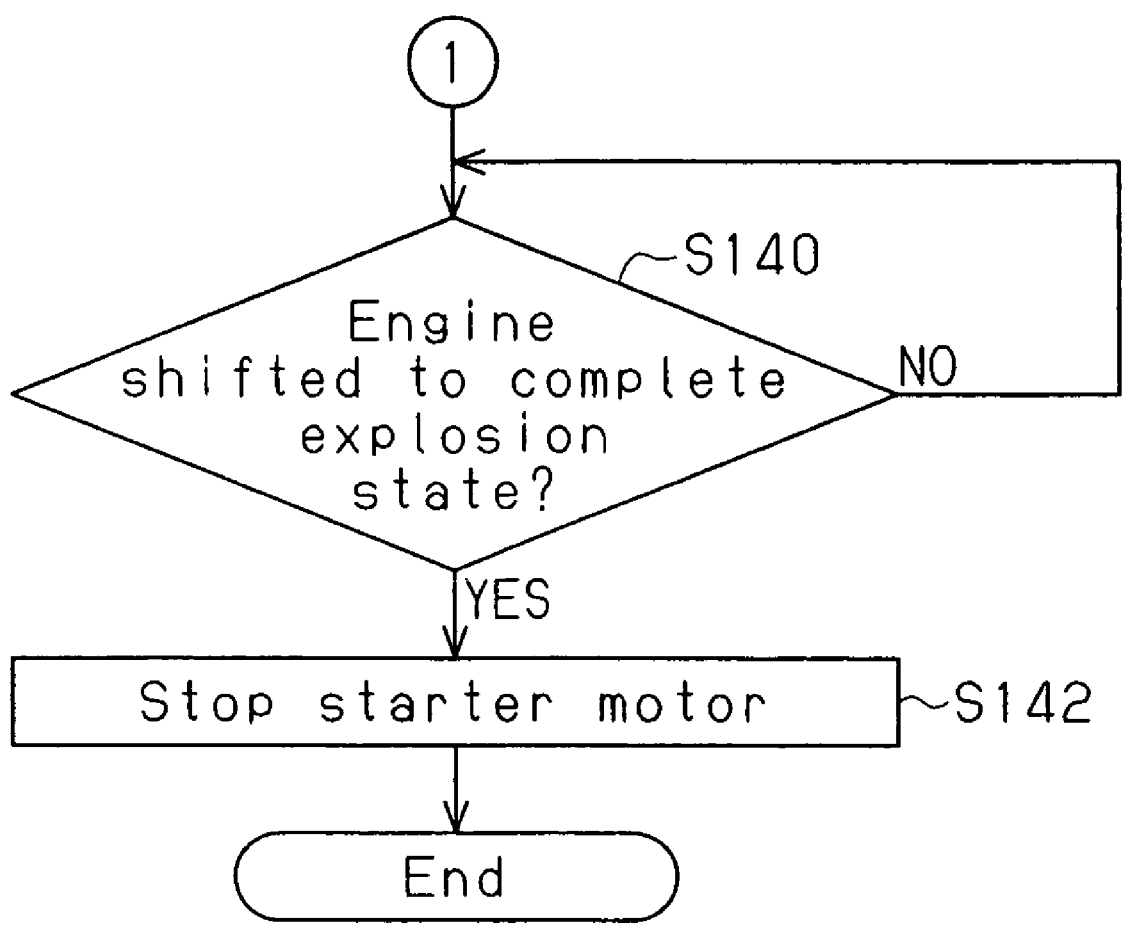
FIG. 4 is a flowchart continued from the flowchart of FIG. 3.

An engine starting process will now be described with reference to FIGS. 3 and 4. This process is started on the condition that the ignition signal IG is switched from OFF to ON.

At first step S110, the electronic control unit 9 determines whether the starter signal STA has been switched from OFF to ON. When the starter signal STA is switched from OFF to ON, the electronic control unit 9 actuates the starter motor 6 at next step S112. When the starter signal STA is OFF, the electronic control unit 9 executes step S110 again when a predetermined period has elapsed. That is, until the starter signal STA becomes ON, the electronic control unit 9 suspends the actuation of the starter motor 6.

After the starter motor 6 is actuated at step S112, the electronic control unit 9 determines at step S120 whether the actuation period of the starter motor 6 (a period elapsed from the start of the actuation (motor actuation period TM)) is longer than a masking period XM (standby period). The masking period XM is determined in advance to be a value for detecting a state in which the voltage of the battery 7 (battery voltage BV) has excessively dropped due to the start of actuation of the starter motor 6.

Through the determination of step S120, the electronic control unit 9 determines the state of battery voltage BV as follows.

(a) When the motor actuation period TM is less than the masking period XM, the electronic control unit 9 determines that the battery voltage BV has excessively dropped due to the actuation of the starter motor 6. In this case, the electronic control unit 9 executes the determination of step S120 again when a predetermined period has elapsed. That is, the electronic control unit 9 suspends the execution of the subsequent process until the battery voltage BV comes out of an excessively dropped state.

(b) When the motor actuation period TM is longer than the masking period XM, the electronic control unit 9 determines that the battery voltage BV has come out of an excessively dropped state due to the actuation of the starter motor 6. In this case, the electronic control unit 9 performs, at next step S122, cylinder discrimination based on detection signals of the crank position sensor 81 and the cam position sensor 82.

At next step S130, the electronic control unit 9 determines whether the cylinder discrimination is completed. When the cylinder discrimination has completed, the electronic control unit 9 permits the execution of fuel injection control and ignition control at next step S132. If the cylinder discrimination has not been competed, the electronic control unit 9 executes step S130 again when a predetermined period has elapsed. That is, until the cylinder discrimination has been completed, the electronic control unit 9 suspends the start of the fuel injection control and the ignition control.

In the fuel injection control, if a starting cylinder CS has been set through another process (engine starting valve duration change process, to be hereinafter described), fuel injection from the injectors 3C is started from the starting cylinder CS. In other cases, fuel injection from the injectors 3C is executed through a normal control.

At next step S140, electronic control unit 9 determines whether the engine 1 has shifted from an initial explosion state to a complete explosion state. In this embodiment, the electronic control unit 9 determines that the engine 1 has shifted from the initial explosion state to the complete explosion state if the engine speed NE is greater than or equal to a determination value. The initial explosion state refers to a state in which air-fuel mixture is burned, but the engine 1 is unable to operate autonomously (that is, the engine 1 needs to be assisted by the starter motor 6). The complete explosion state refers to a state in which the engine 1 can operate autonomously (that is, the engine 1 does not need to be assisted by the starter motor 6).

When the engine 1 has shifted to the complete explosion state, the electronic control unit 9 stops the starter motor 6 at next step S142. If the engine 1 has not shifted to the complete explosion state, the electronic control unit 9 executes step S140 again when a predetermined period has elapsed. That is, until the engine 1 shifts to the complete explosion state, the electronic control unit 9 continues actuating the starter motor 6.

In this manner, the starter motor 6 starts being actuated as the starter signal STA becomes ON in the engine starting process. That is, the electronic control unit 9 starts the starting process of the engine 1. When the engine 1 has shifted to the complete explosion state, the electronic control unit 9 stops the starter motor 6. That is, the electronic control unit 9 finishes the starting process of the engine 1.

Variable Valve Duration Mechanism Actuation Process

Figure 5:
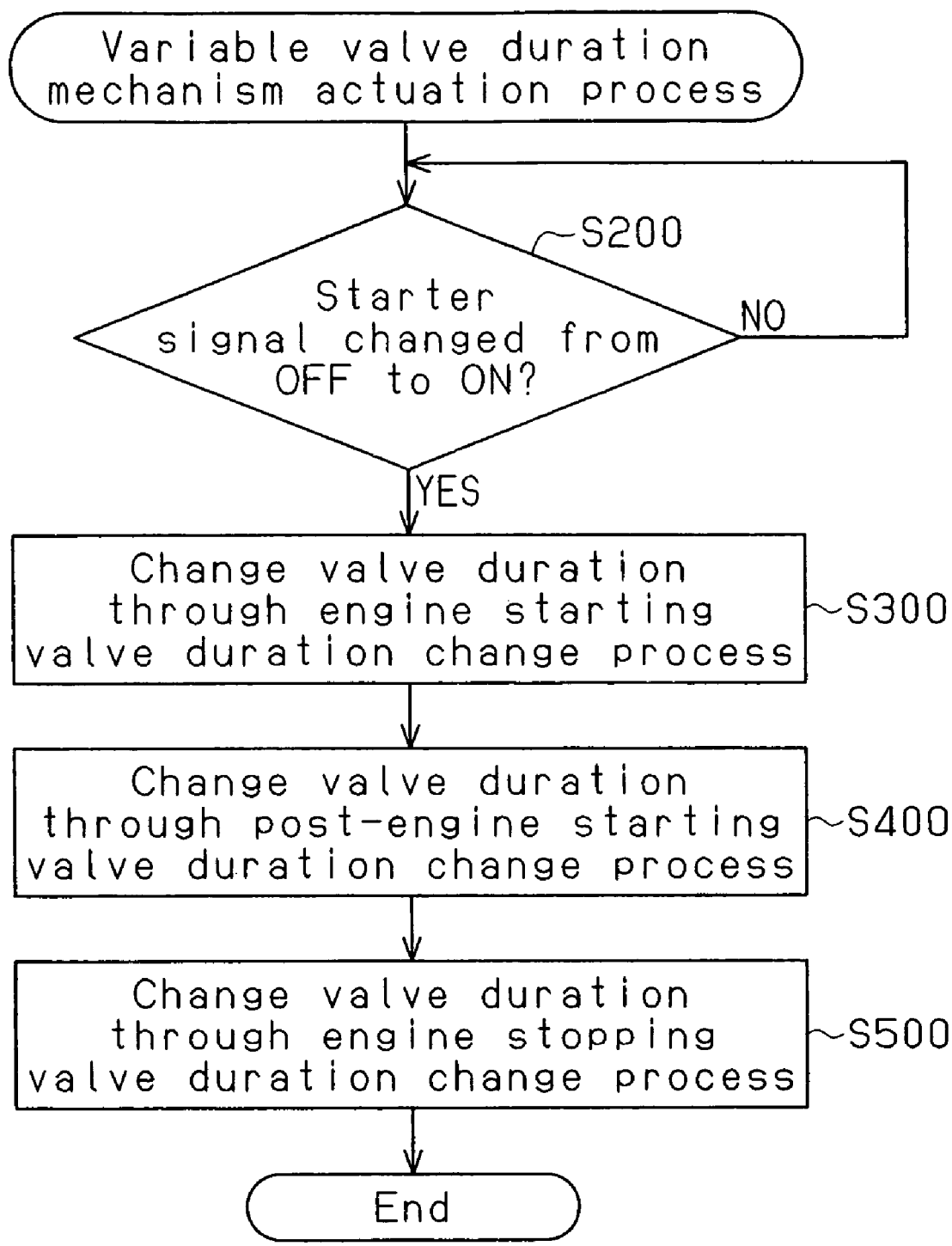
FIG. 5 is a flowchart showing a procedure of a variable valve duration mechanism actuation process executed in the first embodiment.

The variable valve duration mechanism control process will now be described with reference to FIG. 5. This process is started on the condition that the ignition signal IG is switched from OFF to ON.

At first step S200, the electronic control unit 9 determines whether the starter signal STA has been switched from OFF to ON. When the starter signal STA is switched from OFF to ON, the electronic control unit 9 executes the engine starting valve duration change process (FIGS. 6 and 7) at next step S300. When the starter signal STA is OFF, the electronic control unit 9 executes step S200 again when a predetermined period has elapsed. That is, the electronic control unit 9 suspends the execution of the subsequent process until the starter signal STA is switched from OFF to ON.

Through the engine starting valve duration change process at step S300, the electronic control unit 9 sets the valve duration INCAM when starting the engine 1. Setting of the valve duration INCAM in this process is continued until the starting process of the engine 1 is completed. The detailed procedure will be discussed later.

Figure 8:
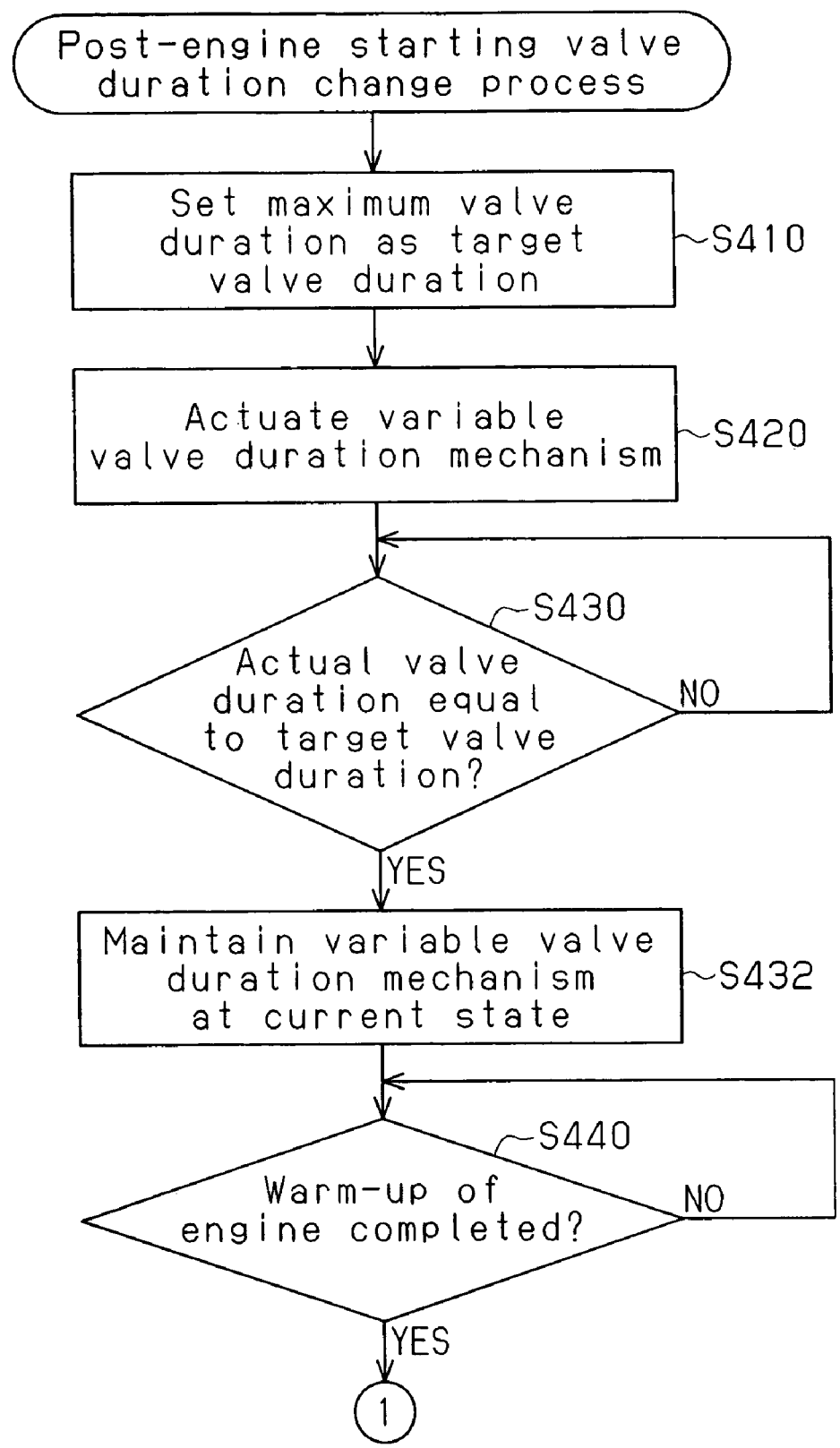
FIG. 8 is a flowchart showing a procedure of a post-engine starting valve duration change process executed in the first embodiment.
Figure 9:
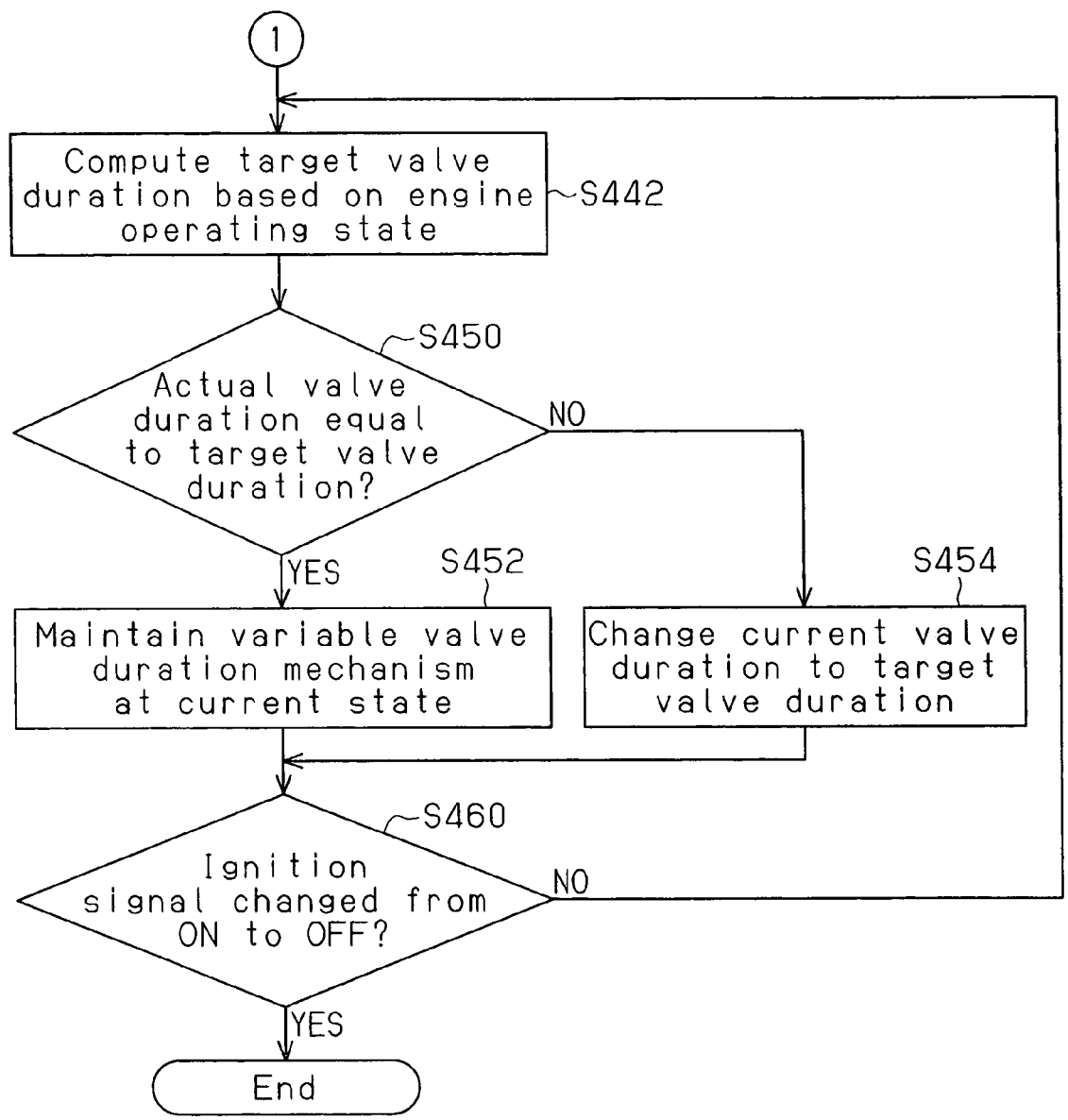
FIG. 9 is a flowchart continued from the flowchart of FIG. 8.

At next step S400, the electronic control unit 9 executes the post-engine starting valve duration change process (FIGS. 8 and 9). Through the post-engine starting valve duration change process, the electronic control unit 9 sets the valve duration INCAM after starting the engine 1 is completed. Setting of the valve duration INCAM in this process is continued until the engine 1 is stopped. The detailed procedure will be discussed later.

Figure 10:
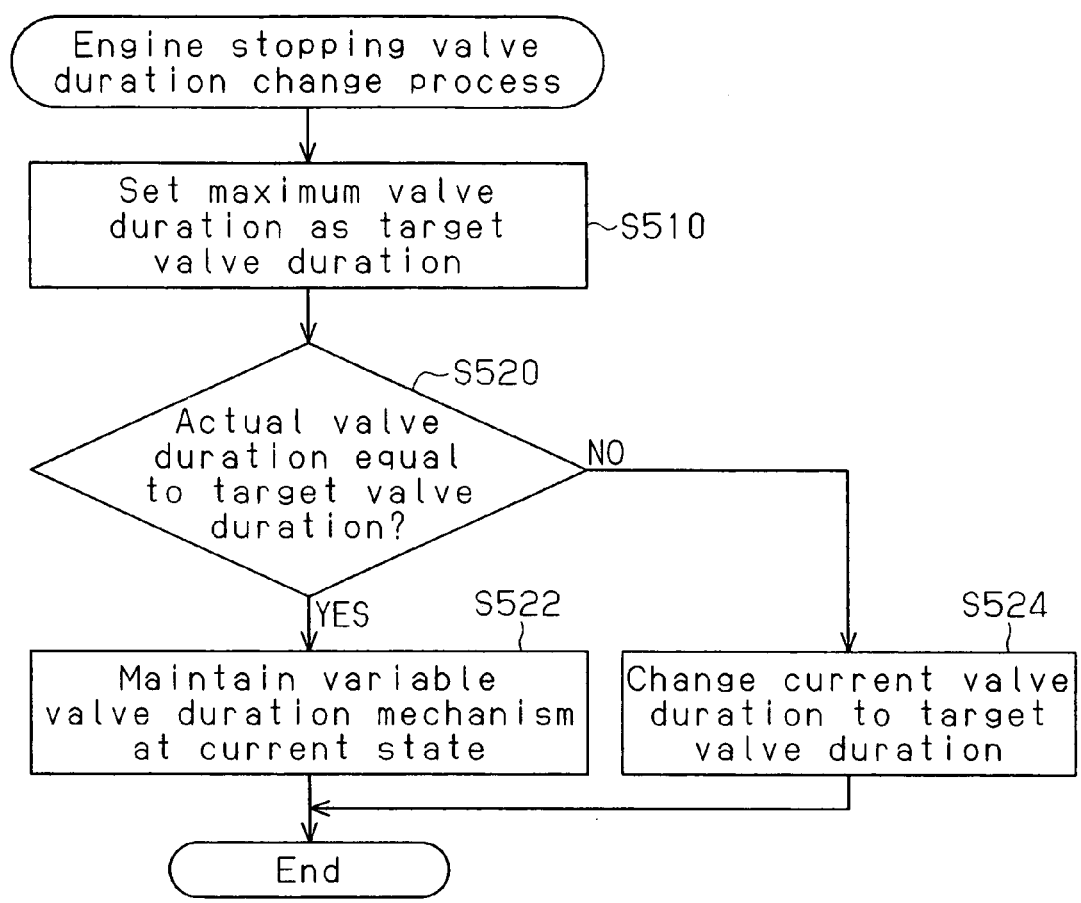
FIG. 10 is a flowchart showing a procedure of an engine stopping valve duration change process executed in the first embodiment.

At next step S500, the electronic control unit 9 executes the engine stopping valve duration change process (FIG. 10). Through the engine stopping valve duration change process, the electronic control unit 9 sets the valve duration INCAM after the engine 1 is stopped. The detailed procedure will be discussed later.

Engine Starting Valve Duration Change Process

Figure 6:
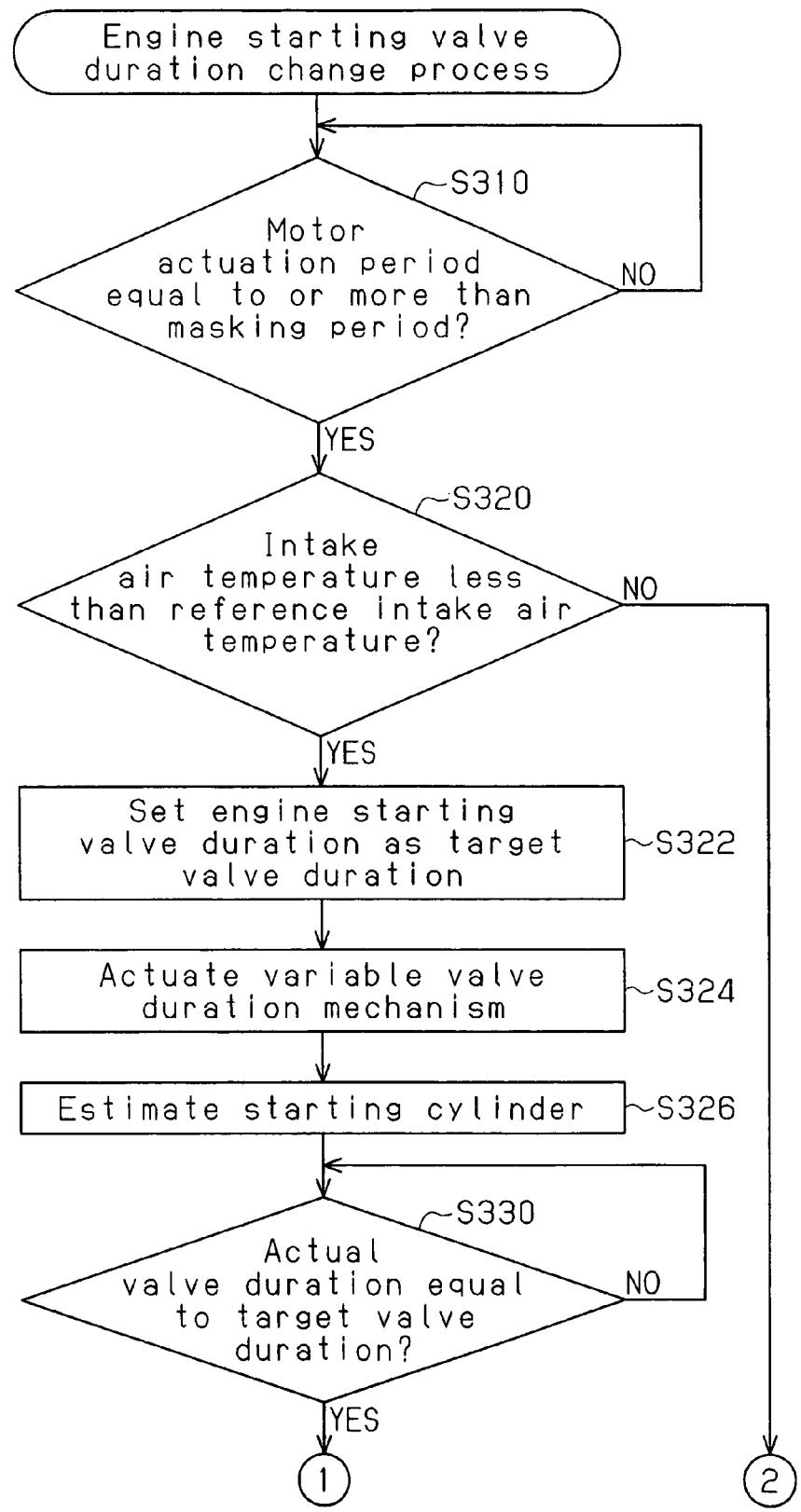
FIG. 6 is a flowchart showing a procedure of an engine starting valve duration change process executed in the first embodiment.
Figure 7:
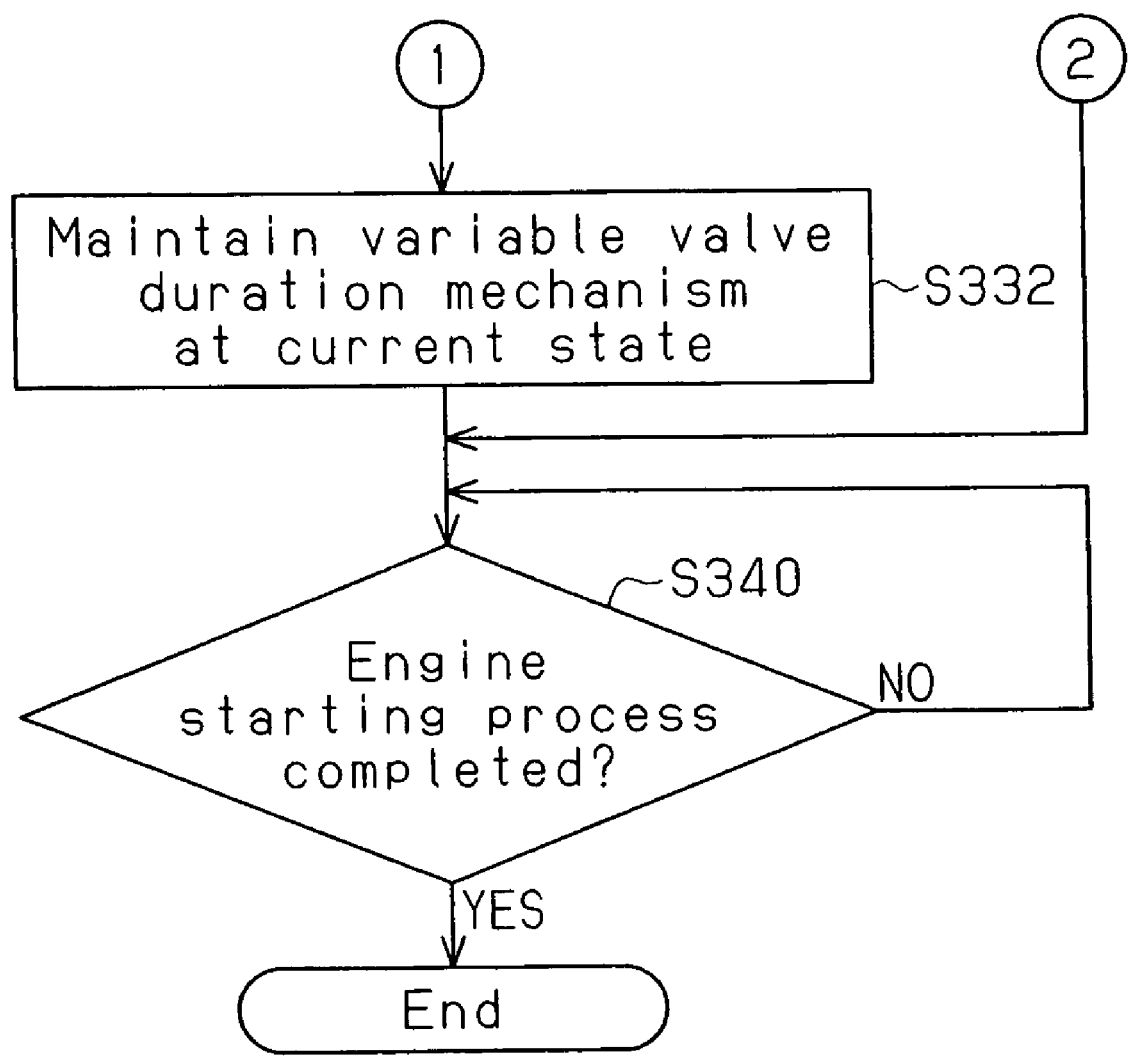
FIG. 7 is a flowchart continued from the flowchart of FIG. 6.

The engine starting valve duration change process will now be described with reference to FIGS. 6 and 7.

In this process, the electronic control unit 9 sets an engine starting valve duration INCAMsta as a target valve duration INCAMtrg until the starting process of the engine 1 is completed, thereby improving the starting performance. On the other hand, when knocking is likely to occur, the electronic control unit 9 inhibits the engine starting valve duration INCAMsta from being set as the target valve duration INCAMtrg, thereby suppressing the occurrence of knocking. The engine starting valve duration INCAMsta refers to the valve duration INCAM with which the closing timing of the intake valves 37 coincides with the bottom dead center in the intake stroke.

At first step S310, the electronic control unit 9 determines whether the actuation period of the starter motor 6 (a period elapsed from the start of the actuation (motor actuation period TM)) is longer than a masking period XM. Through the determination of step S310, the electronic control unit 9 determines the state of battery voltage BV as follows.

(a) When the motor actuation period TM is less than the masking period XM, the electronic control unit 9 determines that the battery voltage BV has excessively dropped due to the actuation of the starter motor 6. In this case, the electronic control unit 9 executes the determination of step S310 again when a predetermined period has elapsed.

(b) When the motor actuation period TM is longer than the masking period XM, the electronic control unit 9 determines that the battery voltage BV has come out of an excessively dropped state due to the actuation of the starter motor 6. In this case, the electronic control unit 9 determines at next step S320 whether the intake air temperature THG is equal to or greater than a reference intake air temperature XTHG.

The reference intake temperature XTHG is set as a value for determining whether knocking occurs when the valve duration INCAM is set to the engine starting valve duration INCAMsta. In this embodiment, the intake air temperature THG is used as a parameter that influences the actual compression ratio, and the reference intake air temperature XTHG is used as a reference value.

Through the determination of step S320, the electronic control unit 9 determines the state of the change in the valve duration INCAM as follows.

(a) When the intake air temperature THG is equal to or greater than the reference intake air temperature XTHG, the electronic control unit 9 determines that knocking is likely to occur due to the fact that the engine starting valve duration INCAMsta is set as the valve duration INCAM. In this case, the electronic control unit 9 executes step S340. That is, the electronic control unit 9 inhibits the engine starting valve duration INCAMsta until the starting process of the engine 1 is completed from being set as the actual valve duration INCAM. In this embodiment, the valve duration INCAM is changed to the maximum valve duration INCAMmax when the engine 1 is stopped. Thus, when the intake air temperature THG is greater than or equal to the reference intake air temperature XTHG, the maximum valve duration INCAMmax is set as the valve duration INCAM.

(b) When the intake air temperature THG is less than the reference intake air temperature XTHG, the electronic control unit 9 determines that knocking is unlikely to occur even if the engine starting valve duration INCAMsta is set as the valve duration INCAM. In this case, the electronic control unit 9 executes step S322.

When the engine starting valve duration INCAMsta is set as the valve duration INCAM, the actual compression ratio of air-fuel mixture is increased. Therefore, the higher the intake air temperature THG, the more likely knocking is to occur.

At step S322, the electronic control unit 9 sets the engine starting valve duration INCAMsta as the target valve duration INCAMtrg.

At next step S324, the electronic control unit 9 starts supplying electricity to the electric actuator 52 to actuate the variable valve duration mechanism 51. In this embodiment, the electronic control unit 9 controls the electric actuator 52 such that the actual valve duration INCAM becomes equal to the engine starting valve duration INCAMsta. The actual valve duration INCAM can be acquired based on the position of the electric actuator 52.

At next step S326, based on the characteristics of the electric actuator 52 and the crank signal CA, the electronic control unit 9 estimates which cylinder 21 first reaches the bottom dead center of the intake stroke after the actual valve duration INCAM is changed to the engine starting valve duration INCAMsta. The predicted cylinder 21 is set as a starting cylinder CS. For example, if the first cylinder among the cylinders 21 is set as the starting cylinder CS, fuel injection from the injectors 3C is started from the first cylinder through the fuel injection control.

At next step S330, the electronic control unit 9 determines whether the actual valve duration INCAM is equal to the target valve duration INCAMtrg. If the actual valve duration INCAM is equal to the target valve duration INCAMtrg, the electronic control unit 9 executes step S332. If the actual valve duration INCAM is not equal to the target valve duration INCAMtrg, the electronic control unit 9 executes step S330 again when a predetermined period has elapsed. That is, the electronic control unit 9 continues actuating the variable valve duration mechanism 51 until the actual valve duration INCAM becomes equal to the target valve duration INCAMtrg.

At step S332, by maintaining the current state of the variable valve duration mechanism 51, the electronic control unit 9 maintains the valve duration INCAM at the engine starting valve duration INCAMsta.

At step S340, the electronic control unit 9 determines whether the starting of the engine 1 has been completed. If the starting of the engine 1 has been completed, the electronic control unit 9 ends the engine starting valve duration change process, and starts the post-engine starting valve duration change process (FIGS. 8 and 9). If the starting of the engine 1 has not been completed, the electronic control unit 9 executes step S340 again when a predetermined period has elapsed. That is, until the starting of the engine 1 has been completed, the electronic control unit 9 suspends the execution of the post-engine starting valve duration change process.

Post-Engine Starting Valve Duration Change Process

The post-engine starting valve duration change process will now be described with reference to FIGS. 8 and 9.

In this process, based on the fact that the starting of the engine 1 has been completed, the electronic control unit 9 sets a valve overlap to promote warm-up. After the warm-up of the engine 1 is completed, the electronic control unit 9 sets the target valve duration INCAMtrg that is suitable for the operating state, thereby improving the fuel economy.

At first step S410, the electronic control unit 9 sets the maximum valve duration INCAmax as the target valve duration INCAMtrg. That is, the electronic control unit 9 changes the target valve duration INCAMtrg such that a valve overlap is set. In this embodiment, the maximum valve duration INCAMmax is set as the target valve duration INCAMtrg. However, as long as a valve overlap amount greater than 0 can be set, any valve duration INCAM may be set as the target valve duration INCAMtrg.

At next step S420, the electronic control unit 9 actuates the variable valve duration mechanism 51 to change the valve duration INCAM to the maximum valve duration INCAMmax.

At next step S430, the electronic control unit 9 determines whether the actual valve duration INCAM is equal to the target valve duration INCAMtrg. If the actual valve duration INCAM is equal to the target valve duration INCAMtrg, the electronic control unit 9 executes step S432. If the actual valve duration INCAM is not equal to the target valve duration INCAMtrg, the electronic control unit 9 executes step S430 again when a predetermined period has elapsed. That is, the electronic control unit 9 continues actuating the variable valve duration mechanism 51 until the actual valve duration INCAM becomes equal to the target valve duration INCAMtrg.

At step S432, by maintaining the current state of the variable valve duration mechanism 51, the electronic control unit 9 maintains the valve duration INCAM at the maximum valve duration INCAMmax.

At next step S440, the electronic control unit 9 determines whether the warm-up of the engine 1 has been completed. In this embodiment, the electronic control unit 9 determines that the warm-up of the engine 1 has been completed if the coolant temperature THW is equal to or greater than a determination value. When the warm-up of the engine 1 has been completed, the electronic control unit 9 executes step S442. If the warm-up of the engine 1 has not been completed, the electronic control unit 9 executes step S440 again when a predetermined period has elapsed. That is, until the warm-up of the engine 1 is completed, the electronic control unit 9 maintains the actual valve duration INCAM at the maximum valve duration INCAMmax.

At step S442, the electronic control unit 9 computes the valve duration INCAM that is suitable for the operating state based on the engine 1 based on the operating state (such as the engine speed NE and the accelerator pedal position). The electronic control unit 9 sets the computed valve duration INCAM as the target valve duration INCAMtrg.

At next step S450, the electronic control unit 9 determines whether the actual valve duration INCAM is equal to the target valve duration INCAMtrg. If the actual valve duration INCAM is equal to the target valve duration INCAMtrg, the electronic control unit 9 executes step S452. If the actual valve duration INCAM is not equal to the target valve duration INCAMtrg, the electronic control unit 9 executes step S454.

At step S452, by maintaining the current state of the variable valve duration mechanism 51, the electronic control unit 9 maintains the current valve duration INCAM.

At step S454, the electronic control unit 9 actuates the variable valve duration mechanism 51 to change the valve duration INCAM to the target valve duration INCAMtrg.

At next step S460, the electronic control unit 9 determines whether the ignition signal IG has been switched from ON to OFF. When the ignition signal IG is switched from ON to OFF, the electronic control unit 9 ends the post-engine starting valve duration change process, and starts the engine stopping valve duration change process (FIG. 10). When the ignition signal IG is ON, the electronic control unit 9 executes step S442 again when a predetermined period has elapsed. That is, until the ignition signal IG is switched OFF, the electronic control unit 9 continues to compute the valve duration INCAM that is suitable for the operating state of the engine 1.

Engine Stopping Valve Duration Change Process

The engine stopping valve duration change process will now be described with reference to FIG. 10.

At first step S510, the electronic control unit 9 sets the maximum valve duration INCAmax as the target valve duration INCAMtrg.

At next step S520, the electronic control unit 9 determines whether the actual valve duration INCAM is equal to the target valve duration INCAMtrg. If the actual valve duration INCAM is equal to the target valve duration INCAMtrg, the electronic control unit 9 executes step S522. If the actual valve duration INCAM is not equal to the target valve duration INCAMtrg, the electronic control unit 9 executes step S524.

At step S522, by maintaining the current state of the variable valve duration mechanism 51, the electronic control unit 9 maintains the valve duration INCAM at the maximum valve duration INCAMmax.

At step S524, the electronic control unit 9 actuates the variable valve duration mechanism 51 to change the valve duration INCAM to the target valve duration INCAMtrg.

Example of Control

Figure 11:
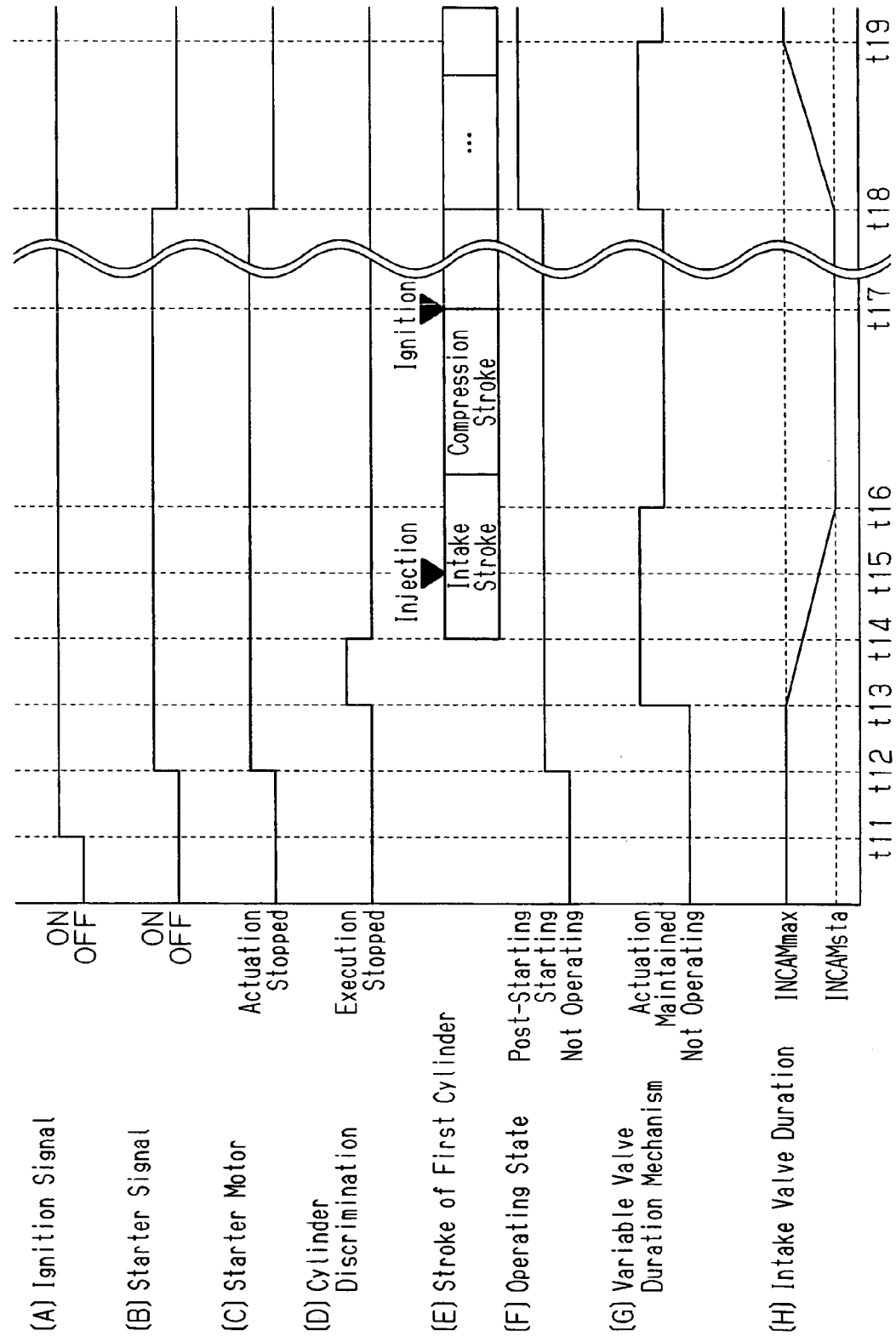
FIG. 11 is a timing chart showing an example of starting of the engine according to the first embodiment.

FIG. 11 shows an example of the starting of the engine 1. Hereinafter, the starting of the engine 1 will be described according to points in time shown in the timing chart of FIG. 11.

(a) Time t11: Change in the ignition signal IG from OFF to ON is detected.

(b) Time t12: Change in the starter signal STA from OFF to ON is detected. At this time, the current supply to the starter motor 6 is started.

(c) Time t13: Since the masking period XM has elapsed from time t12, the cylinder discrimination and the actuation of the variable valve duration mechanism 51 are started. In this embodiment, if the intake air temperature THG is less than the reference intake air temperature XTHG, the valve duration INCAM is changed from the maximum valve duration INCAMmax to the engine starting valve duration INCAMsta.

(d) Time t14: Upon completion of the cylinder discrimination, it is detected that the first cylinder is at the top dead center of the intake stroke. At this time, a cylinder 21 that will first reach the bottom dead center after the valve duration INCAM is changed to the engine starting valve duration INCAMsta is predicted. In this case, the first cylinder is set as the starting cylinder CS.

(e) Time t15: Fuel injection from the injectors 3C is started from the first cylinder.

(f) Time t16: Since the valve duration INCAM is changed to the engine starting valve duration INCAMsta, the current state of the variable valve duration mechanism 51 is maintained.

(g) Time t17: Ignition of air-fuel mixture is performed.

(h) Time t18: As the starting of the engine 1 is completed, the starter motor 6 is stopped. Also, the valve duration INCAM is changed from the engine starting valve duration INCAMsta to the maximum valve duration INCAMmax.

(i) Time t19: Since the valve duration INCAM is changed to the maximum starting valve duration INCAMmax, the current state of the variable valve duration mechanism 51 is maintained.

The first embodiment provides the following advantages.

(1) When the closing timing of the intake valves 37 is set at or close to the bottom dead center, the pressure in each combustion chamber 24 is higher than that in the case where the intake valve closing timing is set other than this. In this case, the ignitability of air-fuel mixture is improved. In this respect, until the starting of the engine 1 is completed, the valve duration INCAM is set to the engine starting valve duration INCAMsta in this embodiment. Accordingly, the starting performance of the engine 1 is improved.

(2) When, through comparison between the intake air temperature THG and the reference intake air temperature XTHG, it is determined that setting the valve duration INCAM to the engine starting valve duration INCAMsta will cause knocking (when the intake air temperature THG is equal to or greater than the reference intake air temperature XTHG), the electronic control unit 9 inhibits the actual valve duration INCAM from being set to the engine starting valve duration INCAMsta. This configuration suppresses the occurrence of knocking.

(3) When starting the engine 1, if fuel injection is started from a cylinder 21 in which the closing timing of the intake valve 37 is not set at or close to the bottom dead center, combustion of air-fuel mixture is performed at a low compression ratio. In this case, the emission performance is not improved. In this respect, after the valve duration INCAM is set to the engine starting valve duration INCAMsta, fuel injection is started from a starting cylinder CS, a cylinder 21 that first reaches the bottom dead center of the intake stroke. In other words, a cylinder 21 that can perform fuel injection at the earliest is selected as a cylinder in which the fuel injection is started, while improving the emission performance. Accordingly, the starting performance of the engine 1 is further improved.

(4) Immediately after the starter motor 6 starts being actuated, the battery voltage BV is lowered due to the supply of electricity to the starter motor 6. In this respect, the actuation of the variable valve duration mechanism 51 (the supply of electricity to the electric actuator 52) is inhibited until the motor actuation period TM becomes equal to the masking period XM. This stabilizes the behavior of the engine 1 during cranking.

(5) In this embodiment, when the completion of the starting of the engine 1 is detected, the valve duration INCAM is changed such that a valve overlap is set. This causes high temperature combustion gas to remain in each combustion chamber 24. The warm-up of the engine 1 is thus promoted.

The above illustrated first embodiment may be modified as shown below.

In the first embodiment, the valve duration INCAM with which the closing timing of the intake valves 37 coincides with the bottom dead center is used as the engine starting valve duration INCAMsta. However, the engine starting valve duration INCAMsta may be changed as follows. That is, the valve duration INCAM with which the closing timing of the intake valves 37 is close to the bottom dead center may be used as the engine starting valve duration INCAMsta. In this case, the same advantages as the first embodiment are obtained.

In the first embodiment, the following process may be added to the engine starting valve duration change process. That is, a process may be added in which the actuation of the variable valve duration mechanism 51 (the supply of electricity to the electric actuator 52) is inhibited until rotation of the crankshaft 26 is detected through the crank position sensor 81. When starting the engine 1, cranking may fail to start properly due to the lowered battery voltage BV. If the process is added, the supply of electricity to the electric actuator 52 is started after rotation of the crankshaft 26 is detected. Thus, the supply of electricity to the electric actuator 52 does not hamper cranking. In the case where cranking doe not start due to, for example, a malfunction of the starter motor 6, the variable valve duration mechanism 51 is prevented from being undesirably actuated.

In the first embodiment, the following process may be added to the engine starting valve duration change process. That is, a process may be added in which, when the battery voltage BV is lower than a reference voltage, change in the valve duration INCAM (the supply of electricity to the electric actuator 52) is inhibited until the starting of the engine 1 is completed. The reference voltage may be determined in advance through experiments as a value for determining whether cranking can be properly performed while electricity is being supplied to the starter motor 6 and the electric actuator 52. If the process is added, the supply of electricity to the electric actuator 52 is inhibited when cranking cannot be properly continued because of the simultaneous actuation of the starter motor 6 and the electric actuator 52. Therefore, starting failure of the engine 1 is avoided.

A second embodiment of the present invention will now be described with reference to FIGS. 12 to 15.

In the first embodiment, the valve duration INCAM is changed to the maximum valve duration INCAMmax when the engine 1 stops. In contrast, in the second embodiment, the valve duration INCAM is changed to the engine starting valve duration INCAMsta when the engine 1 stops. Accordingly, the variable valve duration mechanism actuation process, the engine starting valve duration change process, and the engine stopping valve duration change process are changed as described below. Other than the differences shown below, the second embodiment has the same configuration as the first embodiment.

Variable Valve Duration Mechanism Actuation Process

Figure 12:
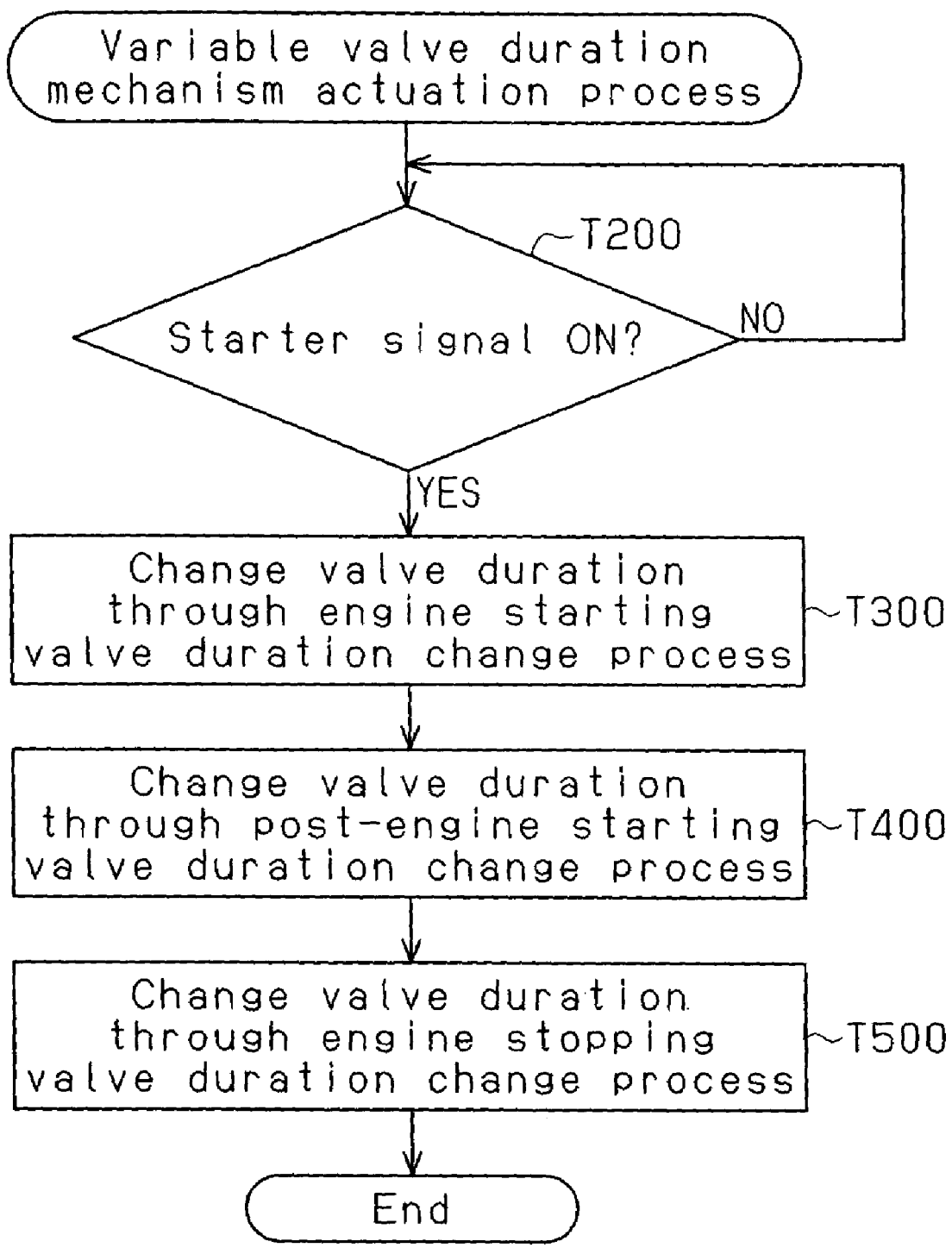
FIG. 12 is a flowchart showing the procedure of a variable valve duration mechanism actuation process executed in a second embodiment of the present invention.

The variable valve duration mechanism control process in the second embodiment will now be described with reference to FIG. 12.

This process is started on the condition that the ignition signal IG is switched from OFF to ON. At first step T200, the electronic control unit 9 determines whether the starter signal STA has been switched from OFF to ON. When the starter signal STA is switched from OFF to ON, the electronic control unit 9 executes the engine starting valve duration change process in the second embodiment (FIGS. 13 and 14) at next step T300. When the starter signal STA is OFF, the electronic control unit 9 executes step T200 again when a predetermined period has elapsed. That is, the electronic control unit 9 suspends the execution of the engine starting valve duration change process until the starter signal STA has been switched from OFF to ON.

Through the engine starting valve duration change process at step T300, the electronic control unit 9 sets the valve duration INCAM when starting the engine 1. Setting of the valve duration INCAM in this process is continued until the starting process of the engine 1 is completed. The detailed procedure will be discussed later.

At next step T400, the electronic control unit 9 executes the post-engine starting valve duration change process (FIGS. 8 and 9). Through the post-engine starting valve duration change process, the electronic control unit 9 sets the valve duration INCAM after starting the engine 1 is completed. Setting of the valve duration INCAM in this process is continued until the engine 1 is stopped.

Figure 15:
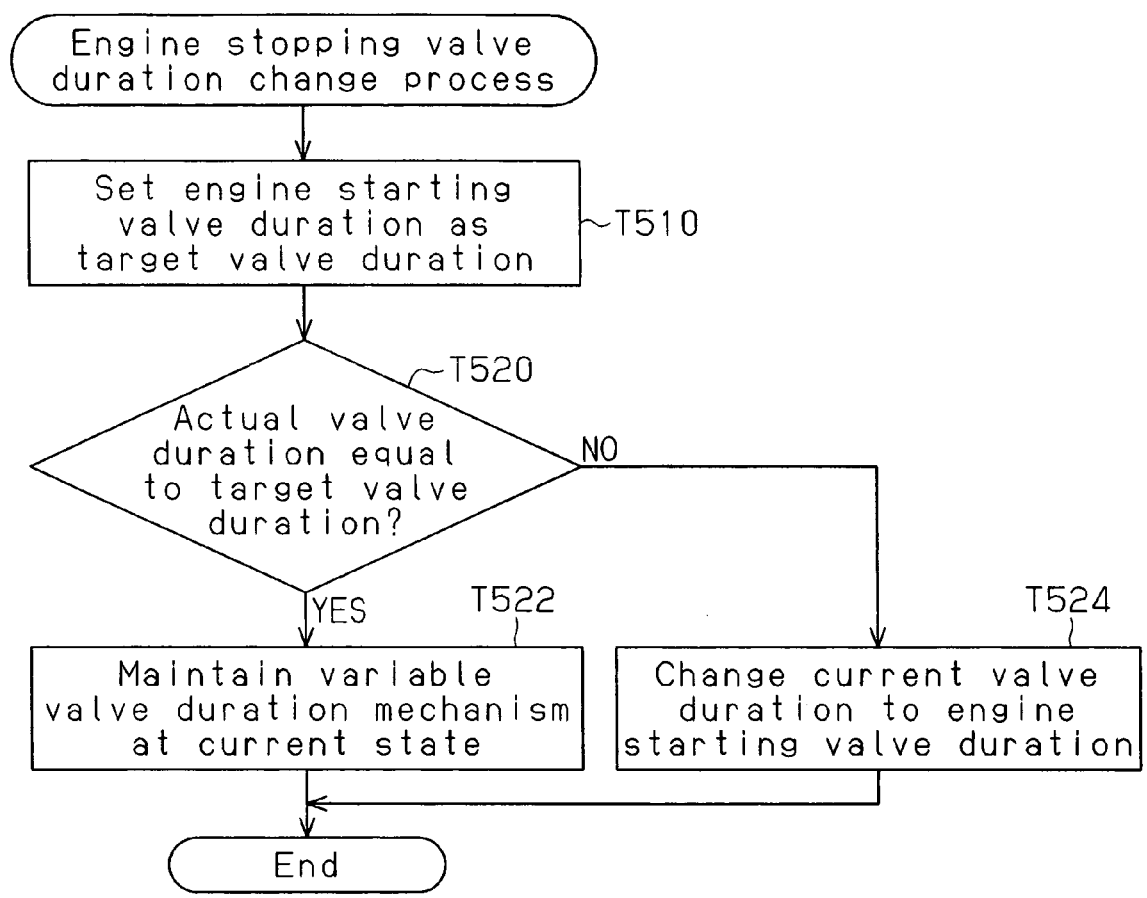
FIG. 15 is a flowchart showing a procedure of an engine stopping valve duration change process executed in the second embodiment.

At next step T500, the electronic control unit 9 executes the engine stopping valve duration change process in the second embodiment (FIG. 15). Through the engine stopping valve duration change process, the electronic control unit 9 sets the valve duration INCAM after the engine 1 is stopped. The detailed procedure will be discussed later.

Engine Starting Valve Duration Change Process

Figure 13:
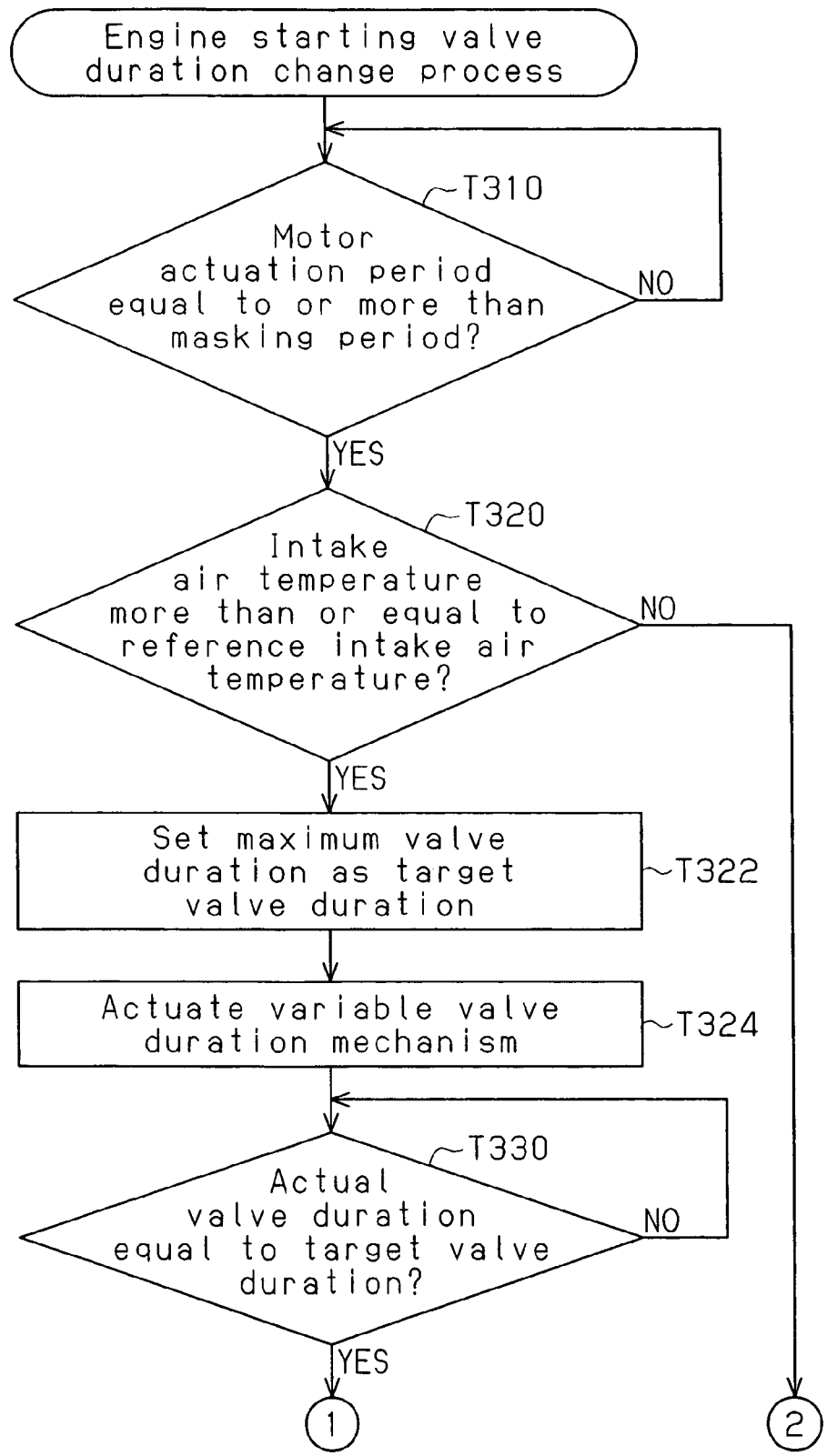
FIG. 13 is a flowchart showing a procedure of an engine starting valve duration change process executed in the second embodiment.
Figure 14:
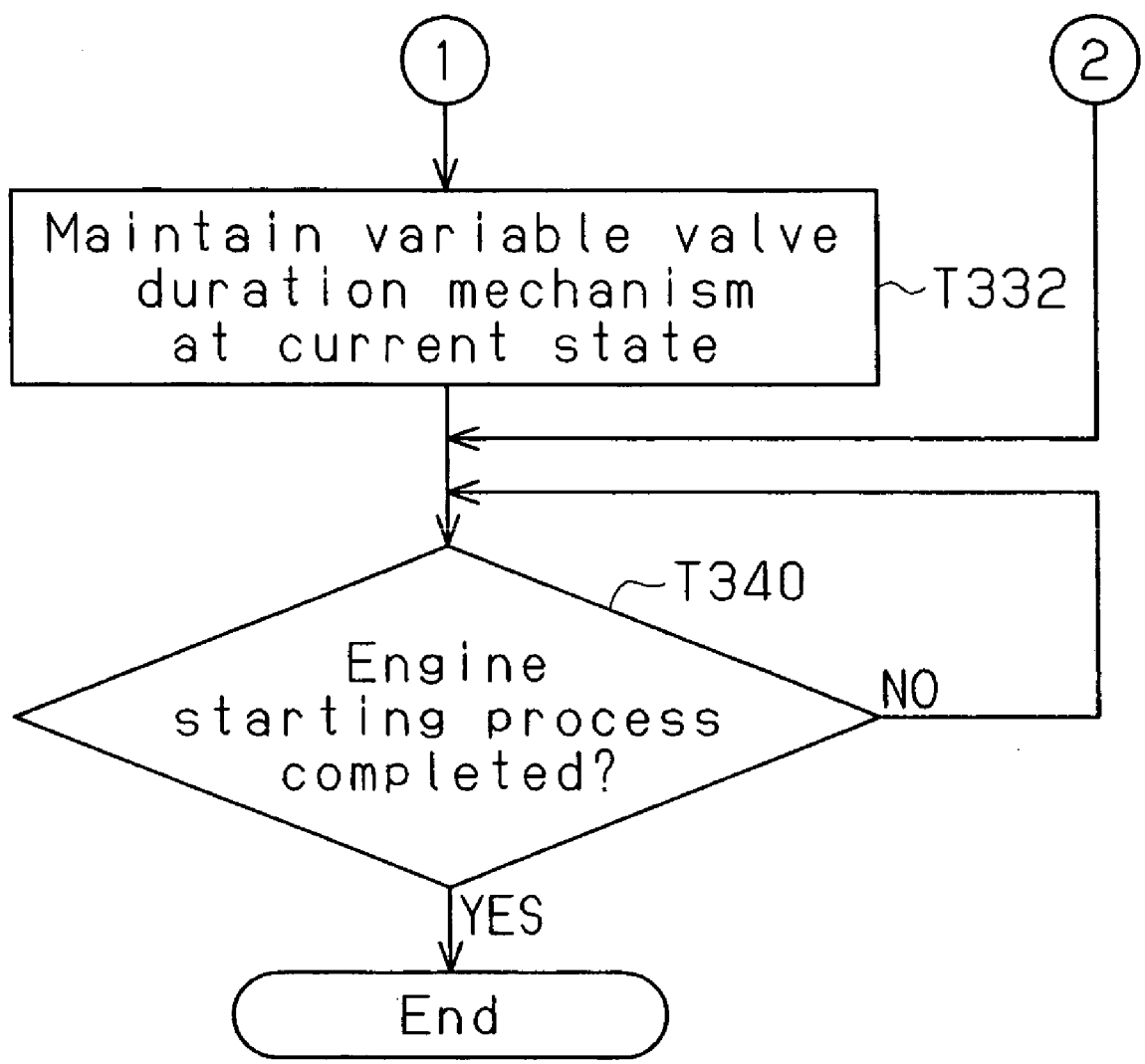
FIG. 14 is a flowchart continued from the flowchart of FIG. 13.

The engine starting valve duration change process in the second embodiment will now be described with reference to FIGS. 13 and 14.

At first step T310, the electronic control unit 9 determines whether the motor actuation period TM is longer than the masking period XM. When the motor actuation period TM is less than the masking period XM, the electronic control unit 9 executes the determination of step T310 again when a predetermined period has elapsed. If the motor actuation period TM is longer than the masking period XM, the electronic control unit 9 determines at next step T320 whether the intake air temperature THG is equal to or greater than a reference intake air temperature XTHG.

At step T320, if the intake air temperature THG is equal to or higher than the reference intake air temperature XTHG, the electronic control unit 9 executes step T322. If the intake air temperature THG is less than the reference intake air temperature XTHG, the electronic control unit 9 executes step T340. That is, the valve duration INCAM is not changed until the starting of the engine 1 is completed.

In this embodiment, the valve duration INCAM is set to the engine starting valve duration INCAMsta when the engine 1 is stopped. Thus, when the intake air temperature THG is less than the reference intake air temperature XTHG, the engine starting valve duration INCAMsta is set as the valve duration INCAM.

At step T322, the electronic control unit 9 sets the maximum valve duration INCAmax as the target valve duration INCAMtrg. That is, the electronic control unit 9 changes the target valve duration INCAMtrg such that a valve overlap is set. In this embodiment, the maximum valve duration INCAMmax is set as the target valve duration INCAMtrg. However, as long as a valve overlap amount greater than 0 can be set, any valve duration INCAM may be set as the target valve duration INCAMtrg.

At next step T324, the electronic control unit 9 starts supplying electricity to the electric actuator 52 to actuate the variable valve duration mechanism 51. In this embodiment, the electronic control unit 9 controls the electric actuator 52 such that the actual valve duration INCAM becomes equal to the maximum valve duration INCAMmax.

At next step T330, the electronic control unit 9 determines whether the actual valve duration INCAM is equal to the target valve duration INCAMtrg. If the actual valve duration INCAM is equal to the target valve duration INCAMtrg, the electronic control unit 9 executes step T332. If the actual valve duration INCAM is not equal to the target valve duration INCAMtrg, the electronic control unit 9 executes step T330 again when a predetermined period has elapsed. That is, the electronic control unit 9 continues actuating the variable valve duration mechanism 51 until the actual valve duration INCAM becomes equal to the target valve duration INCAMtrg.

At step T332, by maintaining the current state of the variable valve duration mechanism 51, the electronic control unit 9 maintains the valve duration INCAM at the engine starting valve duration INCAMsta.

At step T340, the electronic control unit 9 determines whether the starting of the engine 1 has been completed. If the starting of the engine 1 has been completed, the electronic control unit 9 ends the engine starting valve duration change process, and starts the post-engine starting valve duration change process (FIGS. 8 and 9). If the starting of the engine 1 has not been completed, the electronic control unit 9 executes step T340 again when a predetermined period has elapsed. That is, until the starting of the engine 1 has been completed, the electronic control unit 9 suspends the execution of the post-engine starting valve duration change process.

Engine Stopping Valve Duration Change Process

The engine stopping valve duration change process in the second embodiment will now be described with reference to FIG. 15.

At first step T510, the electronic control unit 9 sets the engine starting valve duration INCAsta as the target valve duration INCAMtrg.

At next step T520, the electronic control unit 9 determines whether the actual valve duration INCAM is equal to the target valve duration INCAMtrg. If the actual valve duration INCAM is equal to the target valve duration INCAMtrg, the electronic control unit 9 executes step T522. If the actual valve duration INCAM is not equal to the target valve duration INCAMtrg, the electronic control unit 9 executes step T524.

At step T522, by maintaining the current state of the variable valve duration mechanism 51, the electronic control unit 9 maintains the valve duration INCAM at the maximum valve duration INCAMmax.

At step T524, the electronic control unit 9 actuates the variable valve duration mechanism 51 to change the valve duration INCAM to the target valve duration INCAMtrg.

In addition to the advantages listed in items (1), (2), (4), and (5) in the first embodiment, the second embodiment provides the following advantage.

(6) When changing the valve duration INCAM during the starting of the engine 1, it takes a certain time for the actual valve duration INCAM to be changed to the target valve duration INCAMtrg due to a response delay of the variable valve duration mechanism 51. In this respect, the valve duration INCAM is changed to the engine starting valve duration INCAMsta when the engine 1 stops in preparation for restarting of the engine 1 in this embodiment. The starting performance of the engine 1 is therefore further improved.

A third embodiment of the present invention will now be described with reference to FIG. 1 and FIGS. 16 to 22.

The third embodiment is applied to an in-cylinder injection internal combustion engine 1, which includes a variable valve timing mechanism 53 functioning as a variable valve actuation mechanism.

Structure of Engine

As shown in FIG. 1, the variable valve timing mechanism 53 varies the valve timing of the intake valves 37. That is, the variable valve timing mechanism 53 changes the rotational phase of the intake camshaft 3A relative to the crankshaft 26. As the valve timing is changed, the timing at which the intake valves 37 open (valve opening timing IVO) and the timing at which the intake valves 37 close (valve closing timing IVC) are both advanced or retarded by the same degrees of crank angle.

The variable valve timing mechanism 53 includes an electric actuator 54 as a drive source. In the engine 1, the electric actuator 54 actuates the variable valve timing mechanism 53 so that the valve timing of the intake valves 37 is changed. The engine 1 of this embodiment has the same configuration as the engine 1 of the first embodiment except that the variable valve duration mechanism 51 is replaced by the variable valve timing mechanism 53.

Change in Valve Timing by Variable Valve Timing Mechanism

Changes of valve timing INVT of the intake valves 37 performed by the variable valve timing mechanism 53 will now be described.

Figure 16:
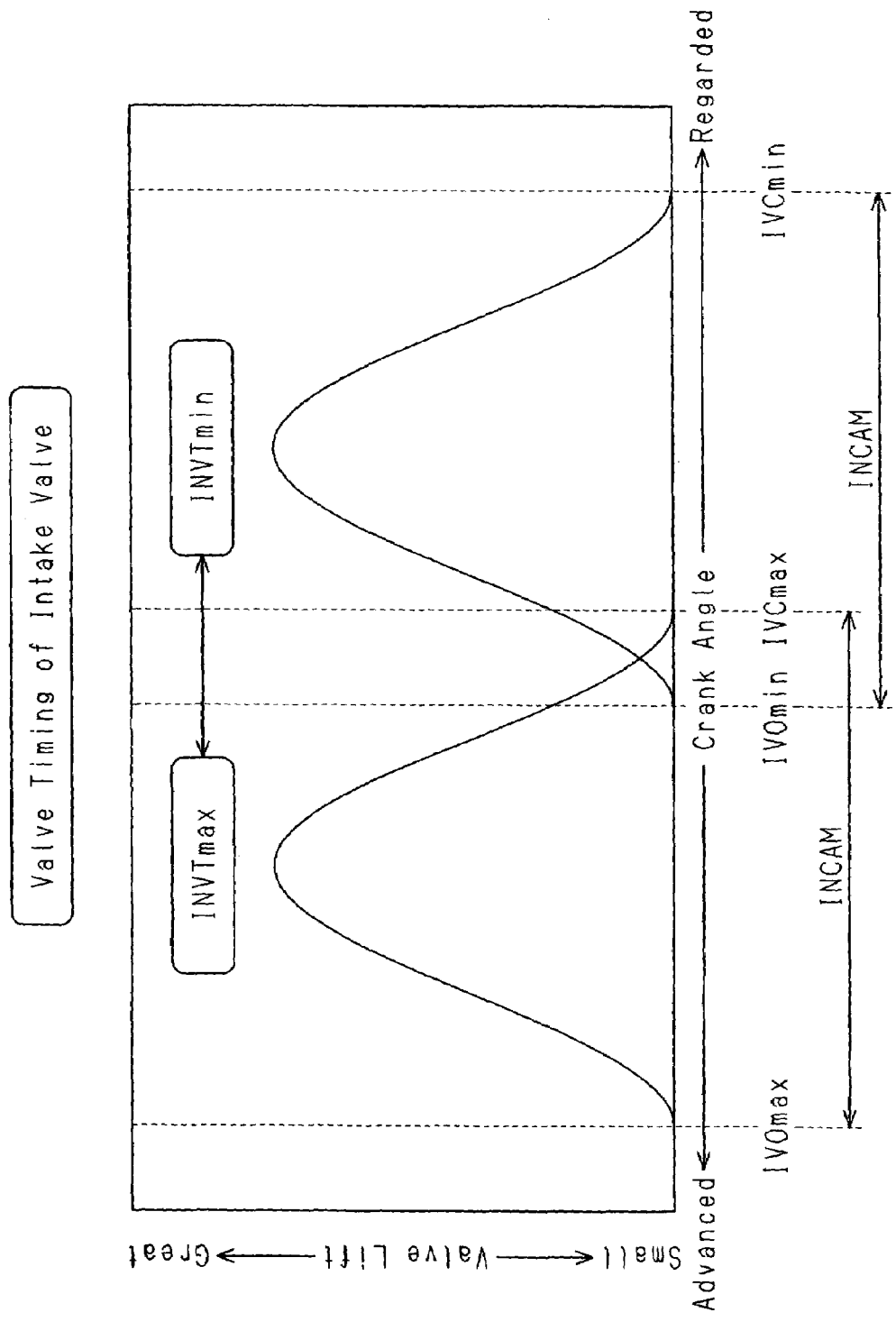
FIG. 16 is a conceptual diagram showing changes in valve timing made by a variable valve timing mechanism according to a third embodiment of the present invention.

As shown in FIG. 16, the valve timing INVT is continuously changeable between a most advanced valve timing INVTmax and a most retarded valve timing INVTmin. The valve opening timing IVO and the valve closing timing IVC are changed with the intake duration INCAM of the intake valves 37 being maintained. That is, the valve duration INCAM at the most advanced valve timing INVTmax (the period from the most advanced valve opening timing IVOmax to the most advanced valve closing timing IVCmax) is equal to the valve duration INCAM at the most retarded valve timing INVTmin (the period from the most retarded valve opening timing IVOmin to the most retarded valve closing timing IVCmin).

Through a variable valve timing mechanism actuation process (FIGS. 17 to 22), the electronic control unit 9 controls the actuation of the variable valve timing mechanism 53 from the start to the end of the operation of the engine 1. That is, the valve timing INVT is changed through the process.

Variable Valve Timing Mechanism Actuation Process

Figure 17:
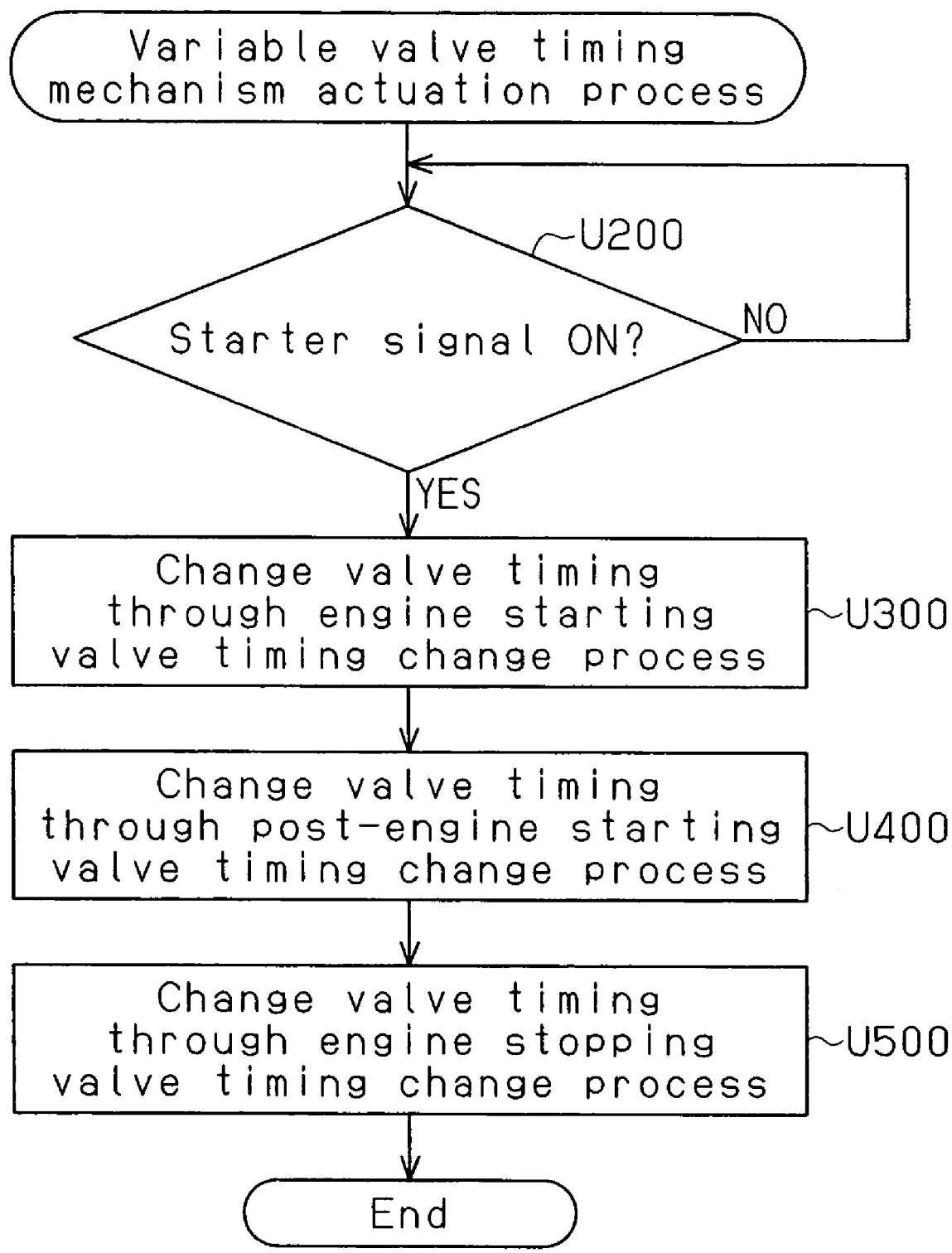
FIG. 17 is a flowchart showing a procedure of a variable valve timing mechanism actuation process executed in the third embodiment.

The variable valve timing mechanism actuation process will now be described with reference to FIG. 17. This process is started on the condition that the ignition signal IG is switched from OFF to ON.

At first step U200, the electronic control unit 9 determines whether the starter signal STA has been switched from OFF to ON. When the starter signal STA is switched from OFF to ON, the electronic control unit 9 executes the engine starting valve timing change process (FIGS. 18 and 19) at next step U300. When the starter signal STA is OFF, the electronic control unit 9 executes step U200 again when a predetermined period has elapsed. That is, the electronic control unit 9 suspends the execution of the engine starting valve timing change process until the starter signal STA is switched from OFF to ON.

Through the engine starting valve timing change process, the electronic control unit 9 sets the valve timing INVT when starting the engine 1. Setting of the valve timing INVT in this process is continued until the starting process of the engine 1 is completed. The detailed procedure will be discussed later.

Figure 20:
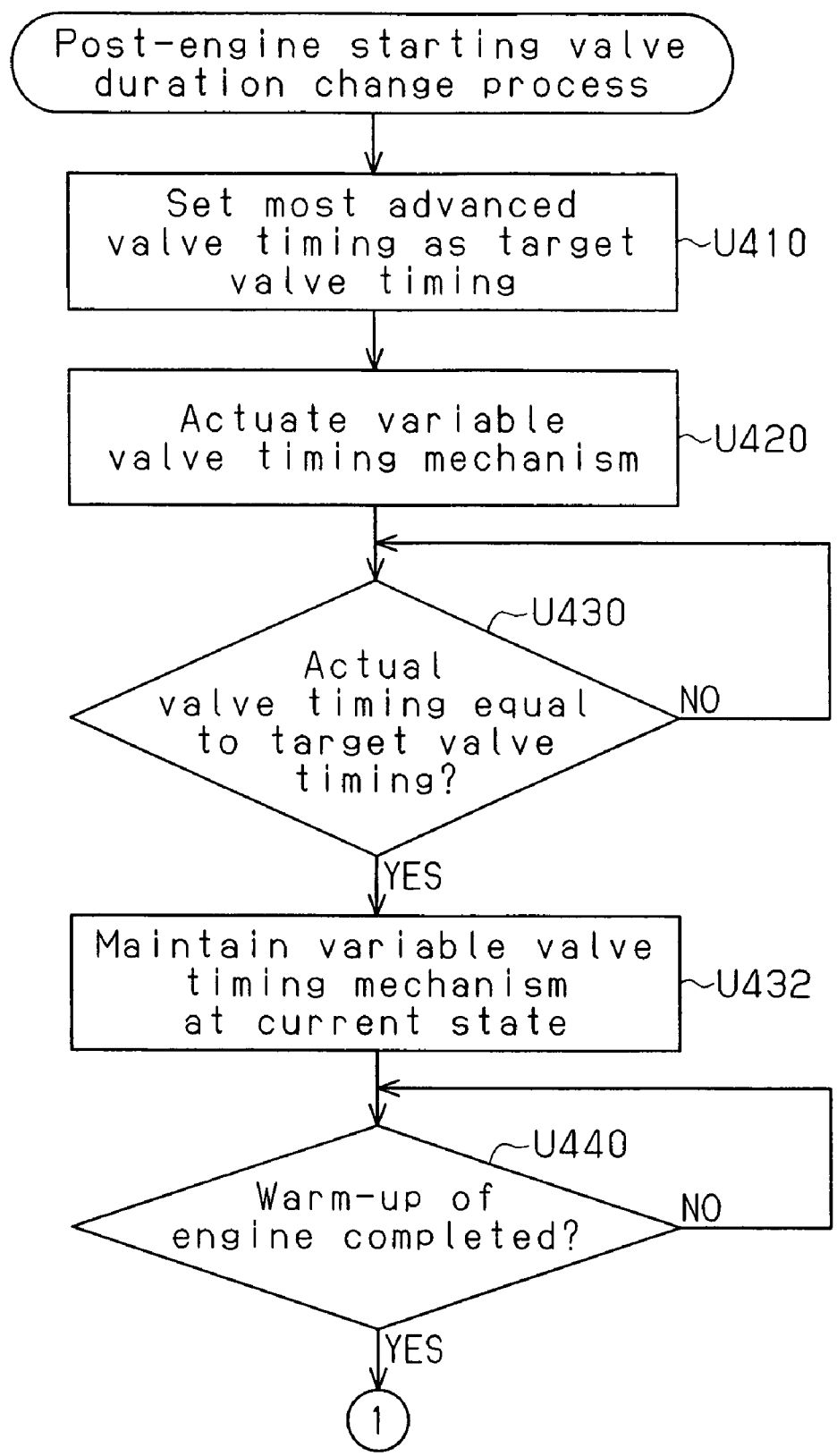
FIG. 20 is a flowchart showing a procedure of a post-engine starting valve timing change process executed in the third embodiment.
Figure 21:
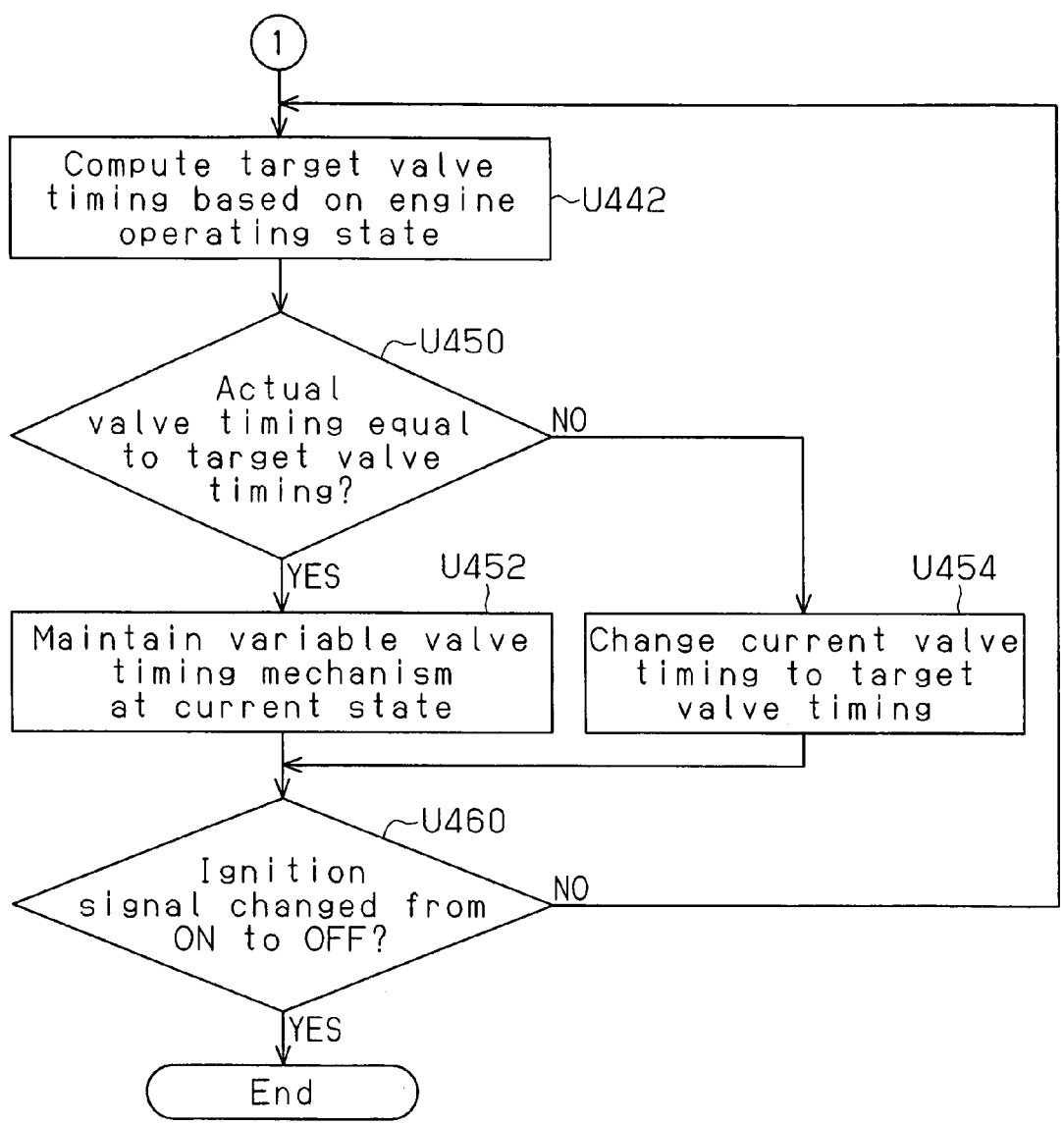
FIG. 21 is a flowchart continued from the flowchart of FIG. 20.

At next step U400, the electronic control unit 9 executes the post-engine starting valve timing change process (FIGS. 20 and 21). Through the post-engine starting valve timing change process, the electronic control unit 9 sets the valve timing INVT after starting the engine 1 is completed. Setting of the valve timing INVT in this process is continued until the engine 1 is stopped. The detailed procedure will be discussed later.

Figure 22:
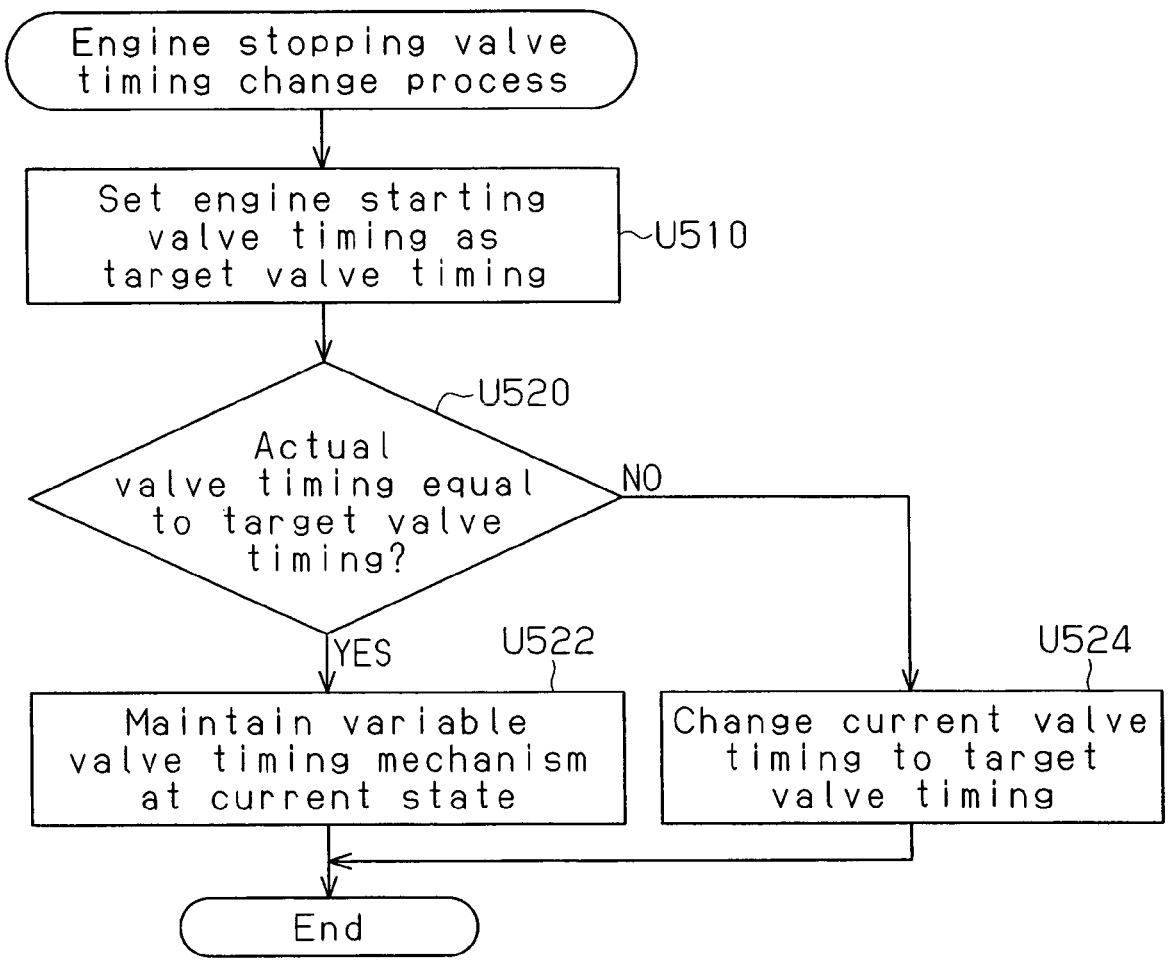
FIG. 22 is a flowchart showing a procedure of an engine stopping valve timing change process executed in the third embodiment.

At next step U500, the electronic control unit 9 executes the engine stopping valve timing change process (FIG. 22). Through the engine stopping valve timing change process, the electronic control unit 9 sets the valve timing INVT after the engine 1 is stopped. The detailed procedure will be discussed later.

Engine Starting Valve Timing Change Process

Figure 18:
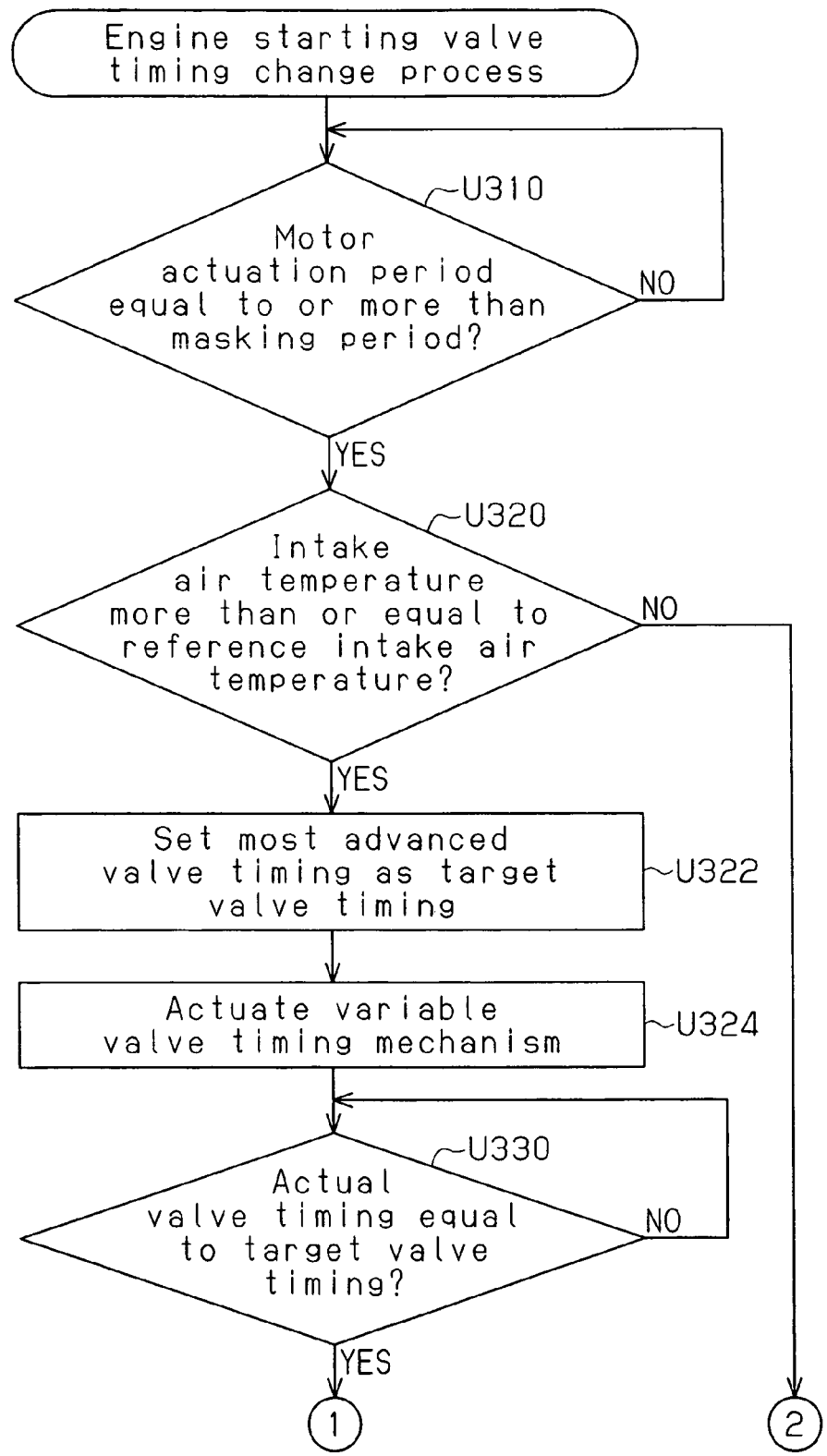
FIG. 18 is a flowchart showing a procedure of an engine starting valve timing change process executed in the third embodiment.
Figure 19:
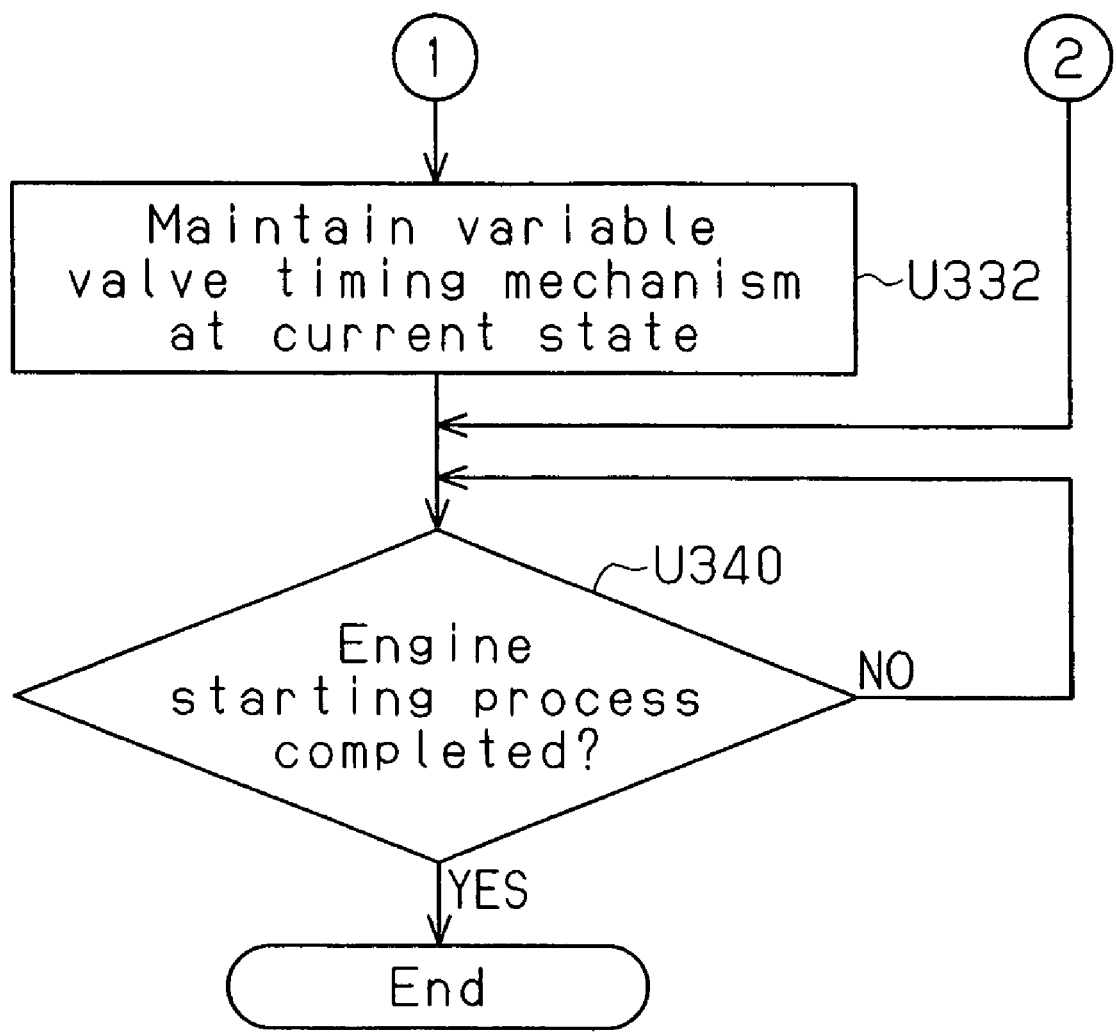
FIG. 19 is a flowchart continued from the flowchart of FIG. 18.

The engine starting valve timing change process will now be described with reference to FIGS. 18 and 19.

In this process, the electronic control unit 9 sets an engine starting valve timing INVTsta as a target valve timing INVTtrg until the starting process of the engine 1 is completed, thereby improving the starting performance. On the other hand, when knocking is likely to occur, the electronic control unit 9 inhibits the engine starting valve timing INVTsta from being set as the target valve timing INVTtrg, thereby suppressing the occurrence of knocking. The engine starting valve timing INVTsta refers to the valve timing INVT with which the closing timing of the intake valves 37 coincides with the bottom dead center in the intake stroke.

At first step U310, the electronic control unit 9 determines whether the actuation period of the starter motor 6 (a period elapsed from the start of the actuation (motor actuation period TM)) is longer than a masking period XM. When the motor actuation period TM is less than the masking period XM, the electronic control unit 9 executes the determination of step U310 again when a predetermined period has elapsed. If the motor actuation period TM is longer than the masking period XM, the electronic control unit 9 determines at next step U320 whether the intake air temperature THG is equal to or greater than a reference intake air temperature XTHG.

Through the determination of step U320, the electronic control unit 9 determines the state of the change in the valve timing INVT as follows.

(a) When the intake air temperature THG is equal to or greater than the reference intake air temperature XTHG, the electronic control unit 9 determines that knocking is likely to occur due to the fact that the engine starting valve timing INVTsta is set as the valve timing INVT. In this case, the electronic control unit 9 executes step U322.

(b) When the intake air temperature THG is less than the reference intake air temperature XTHG, the electronic control unit 9 determines that knocking is unlikely to occur even if the engine starting valve timing INVTsta is set as the valve timing INVT. In this case, the electronic control unit 9 executes step U340. That is, the electronic control unit 9 does not change the valve timing INVT until the starting of the engine 1 is completed.

In this embodiment, the valve timing INVT is changed to the engine starting valve timing INVTsta when the engine 1 is stopped. Thus, when the intake air temperature THG is less than the reference intake air temperature XTHG, the engine starting valve timing INVTsta is set as the actual valve timing INVT.

When the engine starting valve timing INVTsta is set as the valve timing INVT, the actual compression ratio of air-fuel mixture is increased. Therefore, the higher the intake air temperature THG, the more likely knocking is to occur.

At step U322, the electronic control unit 9 sets the most advanced valve timing INVTmax as the target valve timing INVTtrg. That is, the electronic control unit 9 changes the target valve timing INVTtrg such that a valve overlap is set. In this embodiment, the most advanced valve timing INVTmax is set as the target valve timing INVTtrg. However, as long as a valve overlap amount greater than 0 can be set, any valve timing INVT may be set as the target valve timing INVTtrg.

At next step U324, the electronic control unit 9 starts supplying electricity to the electric actuator 52 to actuate the variable valve timing mechanism 53. In this embodiment, the electronic control unit 9 controls the electric actuator 54 such that the actual valve timing INVT becomes equal to the most retarded valve timing INVTmin. The actual valve timing INVT can be acquired based on the position of the electric actuator 54.

At next step U330, the electronic control unit 9 determines whether the actual valve timing INVT is equal to the target valve timing INVTtrg. If the actual valve timing INVT is equal to the target valve timing INVTtrg, the electronic control unit 9 executes step U332. If the actual valve timing INVT is not equal to the target valve timing INVTtrg, the electronic control unit 9 executes step U330 again when a predetermined period has elapsed. That is, the electronic control unit 9 continues actuating the variable valve timing mechanism 53 until the actual valve timing INVT becomes equal to the target valve timing INVTtrg.

At step U332, by maintaining the current state of the variable valve timing mechanism 53, the electronic control unit 9 maintains the valve timing INVT at the most advanced valve timing INVTmax.

At step U340, the electronic control unit 9 determines whether the starting of the engine 1 has been completed. If the starting of the engine 1 has been completed, the electronic control unit 9 ends the engine starting valve timing change process, and starts the post-engine starting valve timing change process (FIGS. 20 and 21). If the starting of the engine 1 has not been completed, the electronic control unit 9 executes step U340 again when a predetermined period has elapsed. That is, until the starting of the engine 1 is completed, the electronic control unit 9 suspends the execution of the post-engine starting valve timing change process.

Post-Engine Starting Valve Timing Change Process

The post-engine starting valve timing change process will now be described with reference to FIGS. 20 and 21.

In this process, based on the fact that the starting of the engine 1 has been completed, the electronic control unit 9 sets a valve overlap to promote warm-up. After the warm-up of the engine 1 is completed, the electronic control unit 9 sets the target valve timing INVTtrg that is suitable for the operating state, thereby improving the fuel economy.

At first step U410, the electronic control unit 9 sets the most advanced valve timing INVTmax as the target valve timing INVTtrg. That is, the electronic control unit 9 changes the target valve timing INVTtrg such that a valve overlap is set. In this embodiment, the most advanced valve timing INVTmax is set as the target valve timing INVTtrg. However, as long as a valve overlap amount greater than 0 can be set, any valve timing INVT may be set as the target valve timing INVTtrg.

At next step U420, the electronic control unit 9 actuates the variable valve timing mechanism 53 to change the valve timing INVT to the most advanced valve timing INVTmax.

At next step U430, the electronic control unit 9 determines whether the actual valve timing INVT is equal to the target valve timing INVTtrg. If the actual valve timing INVT is equal to the target valve timing INVTtrg, the electronic control unit 9 executes step U432. If the actual valve timing INVT is not equal to the target valve timing INVTtrg, the electronic control unit 9 executes step U430 again when a predetermined period has elapsed. That is, the electronic control unit 9 continues actuating the variable valve timing mechanism 53 until the actual valve timing INVT becomes equal to the target valve timing INVTtrg.

At step U432, by maintaining the current state of the variable valve timing mechanism 53, the electronic control unit 9 maintains the valve timing INVT at the most advanced valve timing INVTmax.

At next step U440, the electronic control unit 9 determines whether the warm-up of the engine 1 has been completed. In this embodiment, the electronic control unit 9 determines that the warm-up of the engine 1 has been completed if the coolant temperature THW is equal to or greater than a determination value. When the warm-up of the engine 1 has been completed, the electronic control unit 9 executes step U442. If the warm-up of the engine 1 has not been completed, the electronic control unit 9 executes step U440 again when a predetermined period has elapsed. That is, until the warm-up of the engine 1 is completed, the electronic control unit 9 maintains the actual valve timing INVT at the most advanced valve timing INVTmax.

At step U442, the electronic control unit 9 computes the valve timing INVT that is suitable for the operating state based on the engine 1 based on the operating state (such as the engine speed NE and the accelerator pedal position). The electronic control unit 9 sets the computed valve timing INVT as the target valve timing INVTtrg.

At next step U450, the electronic control unit 9 determines whether the actual valve timing INVT is equal to the target valve timing INVTtrg. If the actual valve timing INVT is equal to the target valve timing INVTtrg, the electronic control unit 9 executes step U452. If the actual valve timing INVT is not equal to the target valve timing INVTtrg, the electronic control unit 9 executes step U454.

At step U452, by maintaining the current state of the variable valve timing mechanism 53, the electronic control unit 9 maintains the current valve timing INVT.

At step U454, the electronic control unit 9 actuates the variable valve timing mechanism 53 to change the valve timing INVT to the target valve timing INVTtrg.

At next step U460, the electronic control unit 9 determines whether the ignition signal IG has been switched from ON to OFF. When the ignition signal IG is switched from ON to OFF, the electronic control unit 9 ends the post-engine starting valve timing change process, and starts the engine stopping valve timing change process (FIG. 22). When the ignition signal IG is ON, the electronic control unit 9 executes step U442 again when a predetermined period has elapsed. That is, until the ignition signal IG is switched OFF, the electronic control unit 9 continues to compute the valve timing INVT that is suitable for the operating state of the engine 1.

Engine Stopping Valve Timing Change Process

The engine stopping valve timing change process will now be described with reference to FIG. 22.

At first step U510, the electronic control unit 9 sets the engine starting valve timing INVTsta as the target valve timing INVTtrg.

At next step U520, the electronic control unit 9 determines whether the actual valve timing INVT is equal to the target valve timing INVTtrg. If the actual valve timing INVT is equal to the target valve timing INVTtrg, the electronic control unit 9 executes step U522. If the actual valve timing INVT is not equal to the target valve timing INVTtrg, the electronic control unit 9 executes step U524.

At step U522, by maintaining the current state of the variable valve timing mechanism 53, the electronic control unit 9 maintains the valve timing INVT at the engine starting valve timing INVTsta.

At step U524, the electronic control unit 9 actuates the variable valve timing mechanism 53 to change the valve timing INVT to the target valve timing INVTtrg.

The third embodiment provides the following advantages.

(1) In this embodiment, the electronic control unit 9 sets the engine starting valve timing INVTsta as the valve timing INVT until the starting process of the engine 1 is completed. Accordingly, the starting performance of the engine 1 is improved.

(2) When, through comparison between the intake air temperature THG and the reference intake air temperature XTHG, it is determined that setting the valve timing INVT to the engine starting valve timing INVTsta will cause knocking (when the intake air temperature THG is equal to or greater than the reference intake air temperature XTHG), the electronic control unit 9 inhibits the actual valve timing INVT from being set to the engine starting valve timing INVTsta. This configuration suppresses the occurrence of knocking.

(3) The actuation of the variable valve timing mechanism 53 (the supply of electricity to the electric actuator 54) is inhibited until the motor actuation period TM becomes equal to the masking period XM. This stabilizes the behavior of the engine 1 during cranking.

(4) In this embodiment, when the completion of the starting of the engine 1 is detected, the valve timing INVT is changed such that a valve overlap is set. This causes high temperature combustion gas to remain in each combustion chamber 24. The warm-up of the engine 1 is thus promoted.

The above illustrated third embodiment may be modified as shown below.

In the third embodiment, the valve timing INVT with which the closing timing of the intake valves 37 coincides with the bottom dead center is used as the engine starting valve timing INVTsta. However, the engine starting valve timing INVTsta may be changed as follows. That is, the valve timing INVT with which the closing timing of the intake valves 37 is close to the bottom dead center may be used as the engine starting valve timing INVTsta. In this case, the same advantages as the third embodiment are obtained.

In the third embodiment, at step U322 of the engine starting valve timing change process, the most advanced valve timing INVTmax is set as the target valve timing INVTtrg. However, the target valve timing INVTtrg set at step U322 may be changed as follows. That is, the target valve timing INVTtrg may be set as a valve timing that is not the engine starting valve timing INVTsta and is not close to the engine starting valve timing INVTsta, as well as prevents the starting performance from deteriorating (for example, a valve timing close to the most advanced valve timing INVTmax).

In the third embodiment, the following process may be added to the engine starting valve timing change process. That is, a process may be added in which the actuation of the variable valve timing mechanism 53 (the supply of electricity to the electric actuator 54) is inhibited until rotation of the crankshaft 26 is detected through the crank position sensor 81. When starting the engine 1, cranking may fail to start properly due to the lowered battery voltage BV. If the process is added, the supply of electricity to the electric actuator 54 is started after rotation of the crankshaft 26 is detected. Thus, the supply of electricity to the electric actuator 54 does not hamper cranking. In the case where cranking doe not start due to, for example, a malfunction of the starter motor 6, the variable valve timing mechanism 53 is prevented from being undesirably actuated.

The above embodiments may be modified as follows.

In the illustrated embodiments, the intake air temperature THG is used as a parameter that influences the actual compression ratio. However, for example, the coolant temperature THW may be used as such a parameter.

In each of the illustrated embodiments, the present invention is applied to an in-cylinder injection internal combustion engine. However, the present invention may be applied to a port injection engine.

The invention claimed is:

1. An apparatus for controlling a variable valve actuation mechanism of an internal combustion engine, the mechanism changing a valve actuation parameter of an intake valve, the apparatus comprising a control section that sets a target valve actuation parameter in accordance with an operating state of the engine, and controls the variable valve actuation mechanism such that the valve actuation parameter of the intake valve becomes equal to the target valve actuation parameter, wherein, from before an initial fuel injection is performed to when a starting process of the engine is completed, the control section sets the target valve actuation parameter to an engine starting valve actuation parameter at which the valve closing timing of the intake valve coincides with or is close to a bottom dead center of the intake stroke; and an electric actuator that is supplied with electricity from a battery to actuate the variable valve actuation mechanism, the battery also supplying electricity to a starter motor that is driven when the engine is started, wherein, until a period elapsed from the start of drive of the starter motor exceeds a period that has been determined in advance as time required for the battery to get out of a voltage drop due to the start of drive of the starter motor, the control section inhibits the supply of electricity to the electric actuator during a starting process of the engine.

2. The apparatus according to claim 1, wherein, when the engine is stopped, the control section sets the target valve actuation parameter to the engine starting valve actuation parameter, and controls the variable valve actuation mechanism such that the valve actuation parameter of the intake valve becomes equal to the target valve actuation parameter.

3. The apparatus according to claim 1, wherein the control section estimates which one of a plurality of cylinders of the engine first reaches the bottom dead center of the intake stroke after the valve actuation parameter is changed to the engine starting valve actuation parameter, and inhibits fuel injection from being started from any of the other cylinders.

4. The apparatus according to claim 1, wherein, when a parameter that influences an actual compression ratio is more than or equal to a reference value, the control section inhibits the target valve actuation parameter from being set to the engine starting valve actuation parameter.

5. The apparatus according to claim 1, wherein, when detecting the completion of the engine starting process, the control section sets a valve overlap by changing the valve actuation parameter of the intake valve.

6. The apparatus according to claim 1, wherein, until rotation of a crankshaft of the engine is detected, the control section inhibits supply of electricity to the electric actuator.

7. The apparatus according to claim 1, wherein, when a voltage of a battery of the engine is less than a preference voltage, the control section inhibits supply of electricity to the electric actuator until the engine starting process has been completed.

8. An apparatus for controlling a variable valve actuation mechanism of an internal combustion engine, the mechanism changing a valve timing of an intake valve, the apparatus comprising a control section that sets a target valve timing in accordance with an operating state of the engine, and controls the variable valve actuation mechanism such that the valve timing of the intake valve becomes equal to the target valve timing, wherein, from before an initial fuel injection is performed to when a starting process of the engine is completed, the control section sets the target valve timing to an engine starting valve timing at which the valve closing timing of the intake valve coincides with or is close to a bottom dead center of the intake stroke; and an electric actuator that is supplied with electricity from a battery to actuate the variable valve actuation mechanism, the battery also supplying electricity to a starter motor that is driven when the engine is started, wherein, until a period elapsed from the start of drive of the starter motor exceeds a period that has been determined in advance as time required for the battery to get out of a voltage drop due to the start of drive of the starter motor, the control section inhibits the supply of electricity to the electric actuator during a starting process of the engine.

9. The apparatus according to claim 8, wherein, when the engine is stopped, the control section sets the target valve timing to the engine starting valve timing, and controls the variable valve actuation mechanism such that the valve timing of the intake valve becomes equal to the target valve timing.

10. The apparatus according to claim 8, wherein the control section estimates which one of a plurality of cylinders of the engine first reaches the bottom dead center of the intake stroke after the valve timing is changed to the engine starting valve timing, and inhibits fuel injection from being started from any of the other cylinders.

11. The apparatus according to claim 8, wherein, when a parameter that influences an actual compression ratio is more than or equal to a reference value, the control section inhibits the target valve timing from being set to the engine starting valve timing.

12. The apparatus according to claim 8, wherein, when detecting the completion of the engine starting process, the control section sets a valve overlap by changing the valve timing of the intake valve.

13. An apparatus for controlling a variable valve actuation mechanism of an internal combustion engine, the mechanism changing a valve duration of an intake valve, the apparatus comprising:

a control section that sets a target valve duration in accordance with an operating state of the engine, and controls the variable valve actuation mechanism such that the valve duration of the intake valve becomes equal to the target valve duration, wherein, from before an initial fuel injection is performed to when a starting process of the engine is completed, the control section sets the target valve duration to an engine starting valve duration at which the valve closing timing of the intake valve coincides with or is close to a bottom dead center of the intake stroke; and an electric actuator that is supplied with electricity from a battery to actuate the variable valve actuation mechanism, the battery also supplying electricity to a starter motor that is driven when the engine is started, wherein, until a period elapsed from the start of drive of the starter motor exceeds a period that has been determined in advance as time required for the battery to get out of a voltage drop due to the start of drive of the starter motor, the control section inhibits the supply of electricity to the electric actuator during a starting process of the engine.

14. The apparatus according to claim 13, wherein, when the engine is stopped, the control section sets the target valve duration to the engine starting valve duration, and controls the variable valve actuation mechanism such that the valve duration of the intake valve becomes equal to the target valve duration.

15. The apparatus according to claim 13, wherein the control section estimates which one of a plurality of cylinders of the engine first reaches the bottom dead center of the intake stroke after the valve duration is changed to the engine starting valve duration, and inhibits fuel injection from being started from any of the other cylinders.

16. The apparatus according to claim 13, wherein, when a parameter that influences an actual compression ratio is more than or equal to a reference value, the control section inhibits the target valve duration from being set to the engine starting valve duration.

17. The apparatus according to claim 13, wherein, when detecting the completion of the engine starting process, the control section sets a valve overlap by changing the valve duration of the intake valve.

18. A method for controlling a variable valve actuation mechanism of an internal combustion engine, the mechanism changing a valve actuation parameter of an intake valve, the method comprising:

setting a target valve actuation parameter in accordance with an operating state of the engine; and controlling the variable valve actuation mechanism such that the valve actuation parameter of the intake valve becomes equal to the target valve actuation parameter, wherein, from before an initial fuel injection is performed to when a starting process of the engine is completed, the target valve actuation parameter is set to an engine starting valve actuation parameter at which the valve closing timing of the intake valve coincides with or is close to a bottom dead center of the intake stroke; and wherein the supply of electricity to an electric actuator, which is supplied with electricity from a battery to actuate the variable valve actuation mechanism, during a starting process of the engine is inhibited until a period elapsed from the start of drive of a starter motor, which is also supplied with electricity from the battery and which is driven when the engine is started, exceeds a period that has been determined in advance as time required for the battery to get out of a voltage drop due to the start of drive of the starter motor.

* * * * *